United States Patent
Nagahara

(10) Patent No.: US 9,250,427 B2
(45) Date of Patent: Feb. 2, 2016

(54) PROJECTION LENS AND PROJECTION DISPLAY APPARATUS

(71) Applicant: FUJIFILM Corporation, Tokyo (JP)

(72) Inventor: Akiko Nagahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/288,421

(22) Filed: May 28, 2014

(65) Prior Publication Data

US 2014/0355127 A1   Dec. 4, 2014

(30) Foreign Application Priority Data

May 31, 2013   (JP) .................................. 2013-114972

(51) Int. Cl.
| | | |
|---|---|---|
| G02B 3/00 | (2006.01) | |
| G02B 15/14 | (2006.01) | |
| G02B 3/02 | (2006.01) | |
| G02B 13/18 | (2006.01) | |
| G02B 9/62 | (2006.01) | |
| G02B 15/177 | (2006.01) | |
| G02B 13/16 | (2006.01) | |
| G02B 27/00 | (2006.01) | |
| G02B 13/04 | (2006.01) | |
| G02B 15/20 | (2006.01) | |
| G02B 13/00 | (2006.01) | |

(52) U.S. Cl.
CPC .............. *G02B 15/177* (2013.01); *G02B 13/16* (2013.01); *G02B 9/62* (2013.01); *G02B 13/009* (2013.01); *G02B 13/0045* (2013.01); *G02B 13/04* (2013.01); *G02B 13/18* (2013.01); *G02B 15/20* (2013.01); *G02B 27/0025* (2013.01)

(58) Field of Classification Search
CPC ...... G02B 13/0045; G02B 9/62; G02B 13/18; G02B 15/177; G02B 13/04; G02B 13/16; G02B 13/009; G02B 15/20; G02B 27/0025
USPC ......... 359/649, 677, 679, 680–682, 713, 724, 359/737, 756, 761
See application file for complete search history.

(56) References Cited

U.S. PATENT DOCUMENTS

| | | |
|---|---|---|
| 7,576,921 B2 | 8/2009 | Inoko |
| 2012/0293870 A1* | 11/2012 | Ichimura ....................... 359/679 |

FOREIGN PATENT DOCUMENTS

| | | |
|---|---|---|
| EP | 2 108 989 | 10/2009 |
| JP | 2008-257005 | 10/2008 |
| JP | 2009-251316 | 10/2009 |
| JP | 2011-145580 | 7/2011 |

* cited by examiner

*Primary Examiner* — Evelyn A Lester
(74) *Attorney, Agent, or Firm* — Young & Thompson

(57) ABSTRACT

A projection lens is provided having a positive refractive power as a whole and including a correction group consisting of a plurality of lens groups that corrects field curvature by moving in an optical axis direction and changing the distance between each lens group. The conjugation length of a combined optical system combining the most magnification side lens group constituting the correction group to the most reduction side lens group constituting the correction group in the projection lens is constant before and after the movement of the correction group for correcting field curvature. If the projection lens is variable in magnification or focusable by moving at least some of the lens groups, the movement of the correction group for correcting field curvature is allowed to be performed independently of the movement for either changing magnification or focusing.

14 Claims, 34 Drawing Sheets

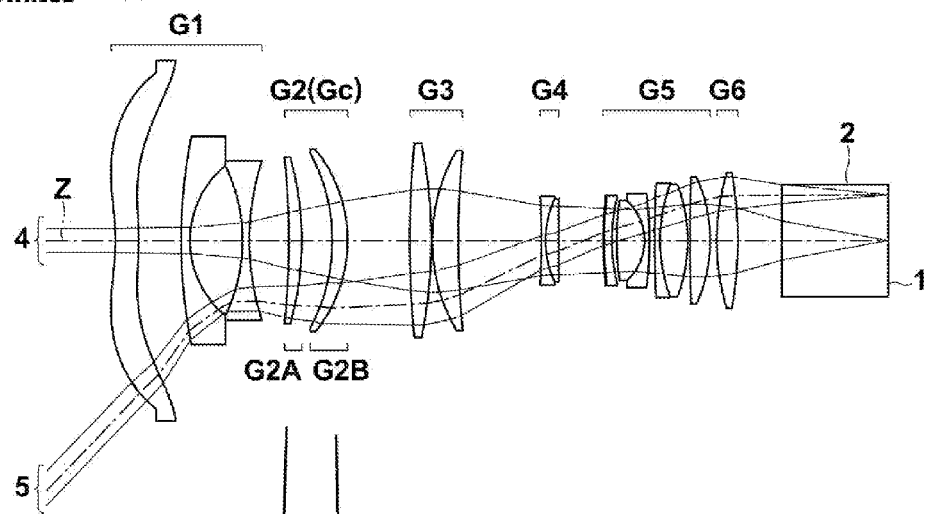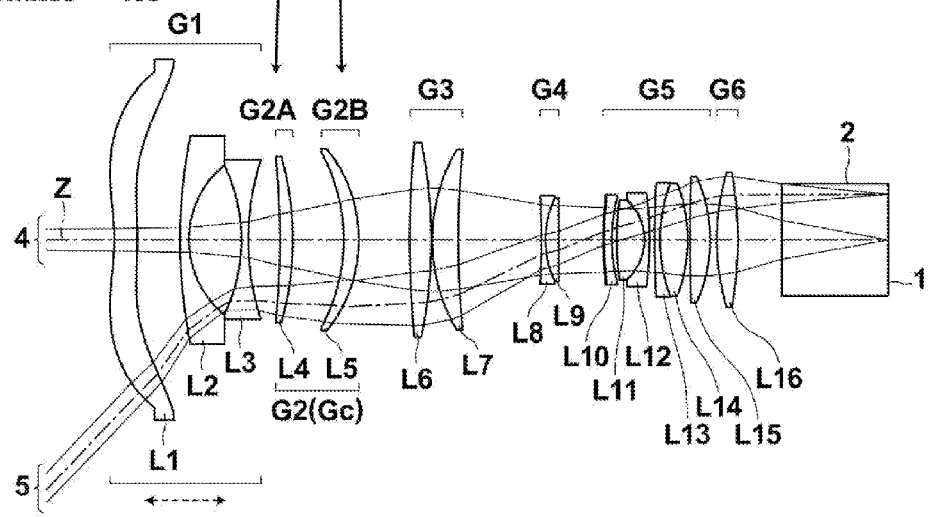

FIG.5
EXAMPLE 1
WIDE ANGLE END
PROJECTION
DISTANCE = ∞
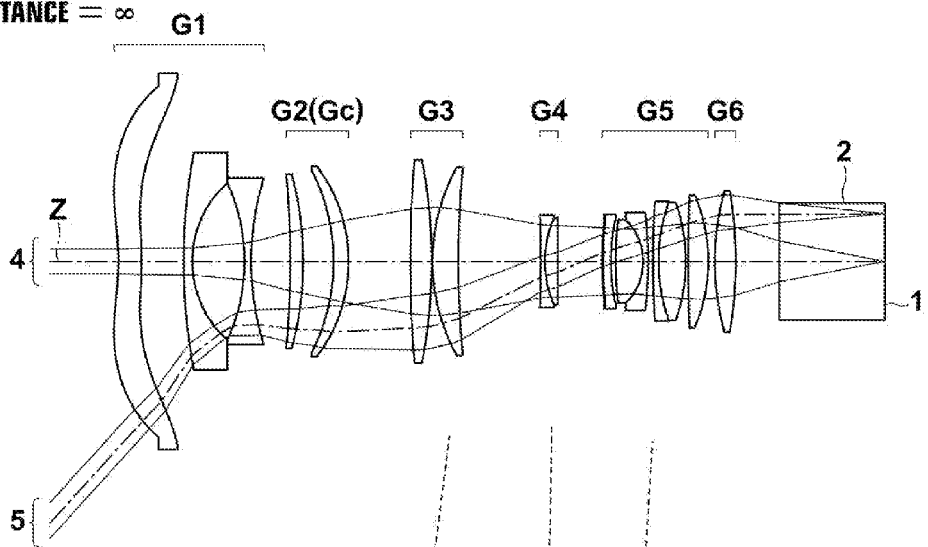
TELEPHOTO END
PROJECTION
DISTANCE = ∞
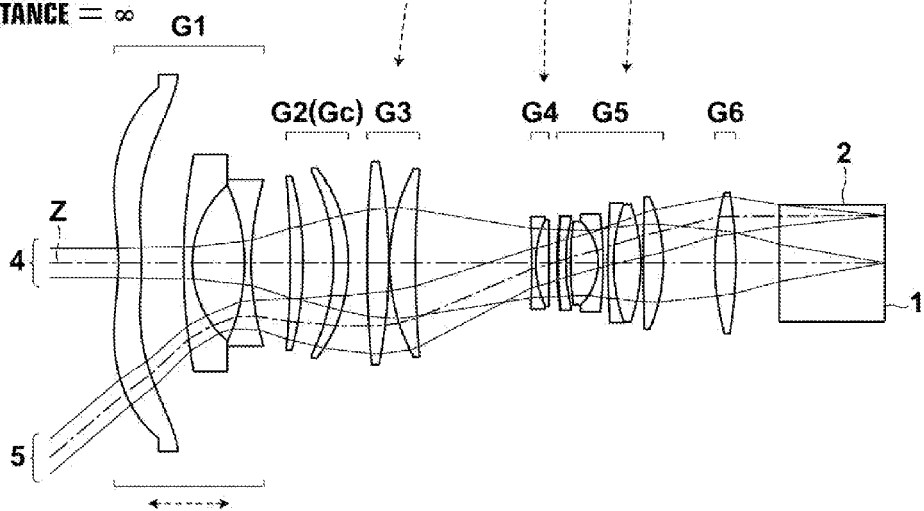

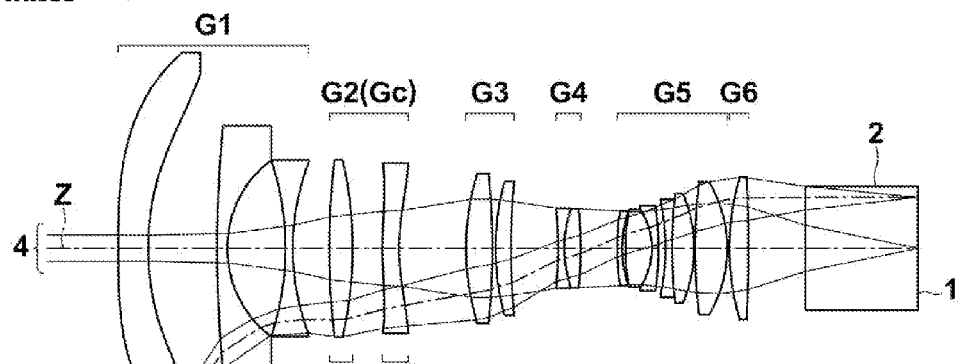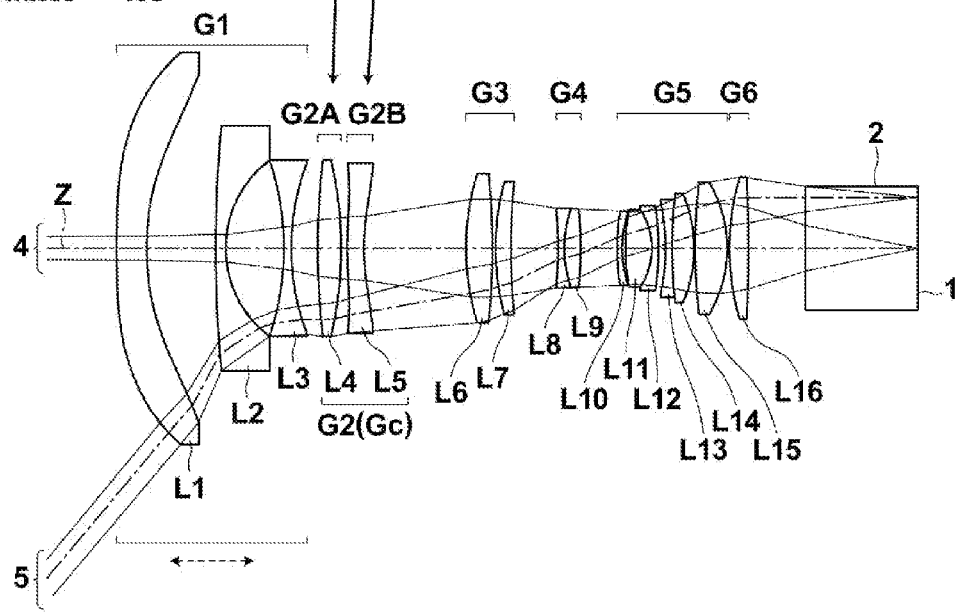
FIG.6

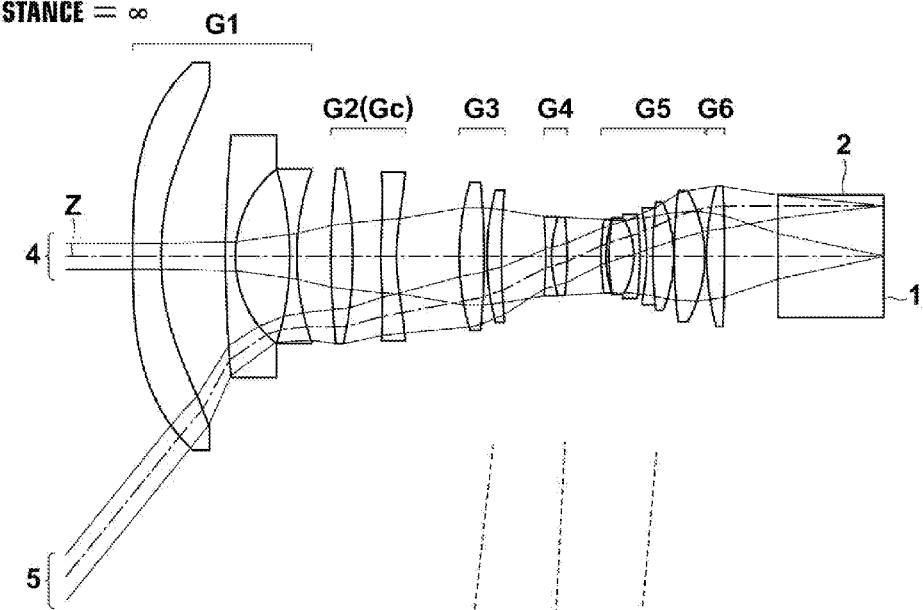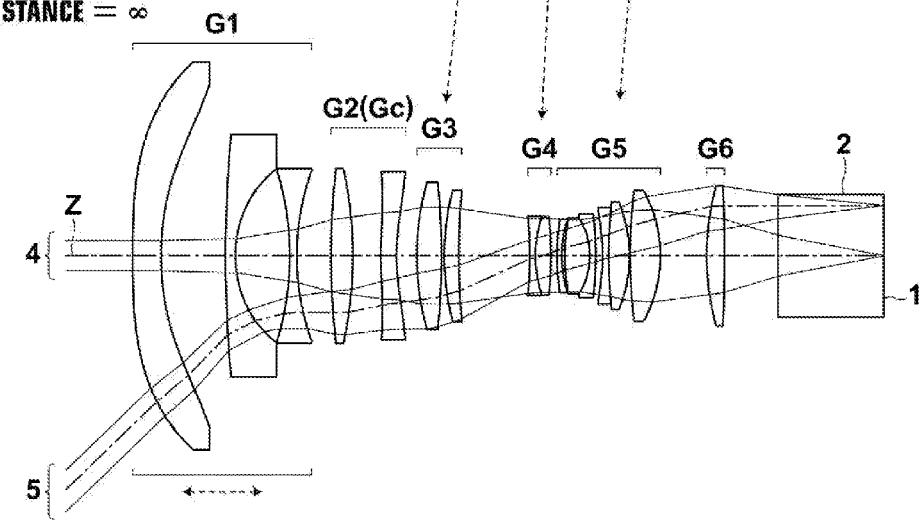

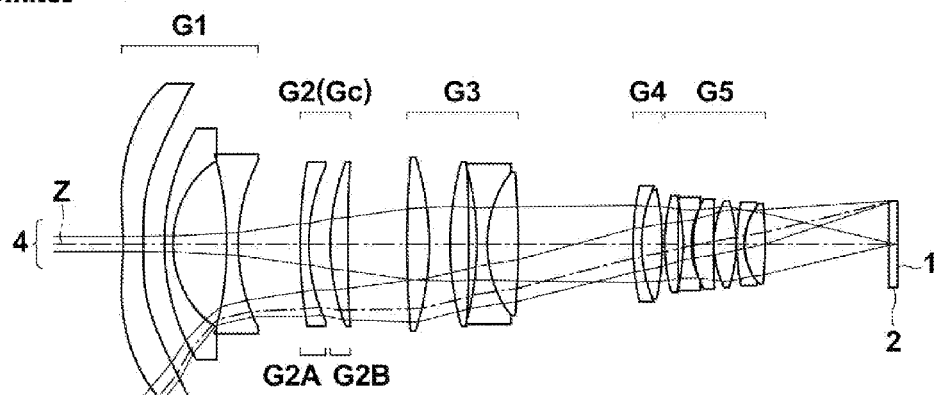
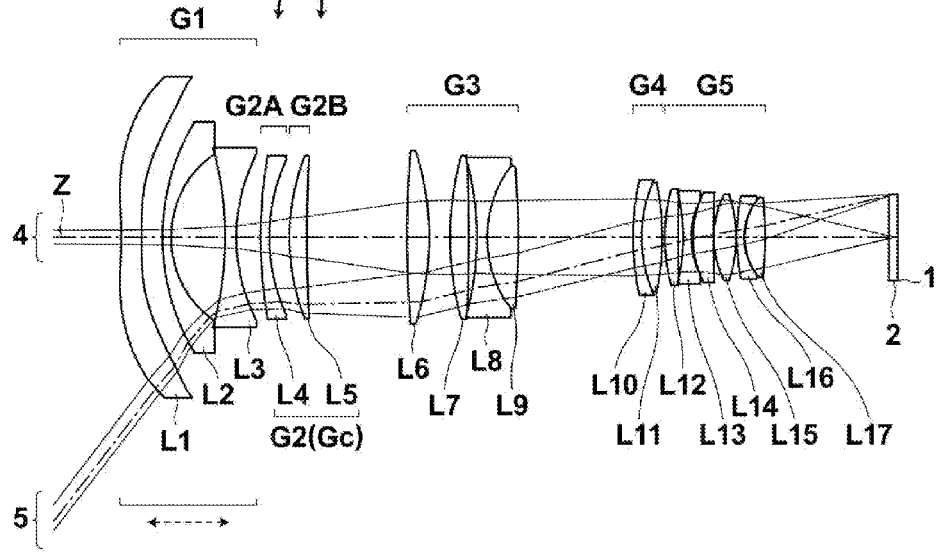
FIG.8

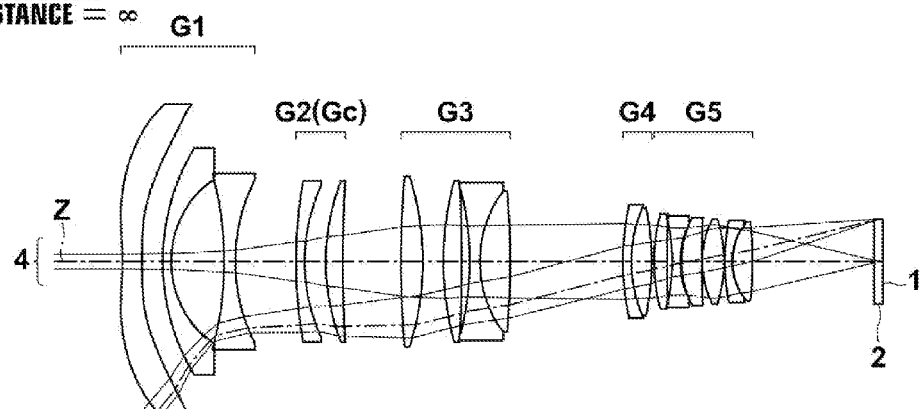
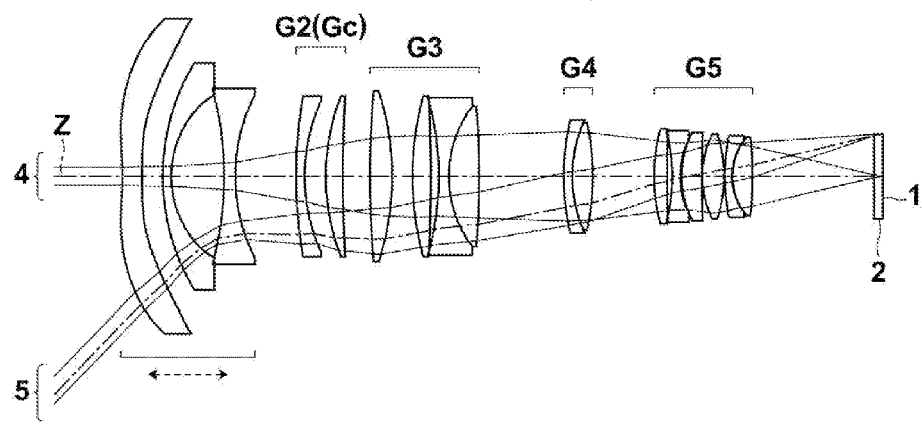
FIG.9

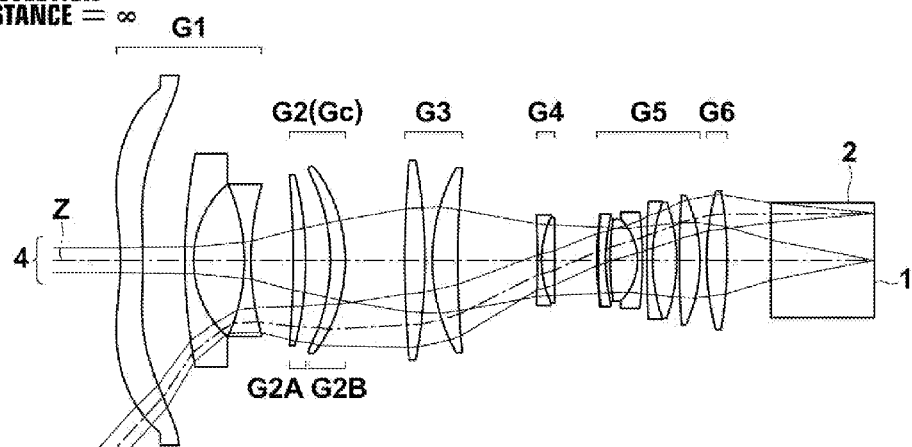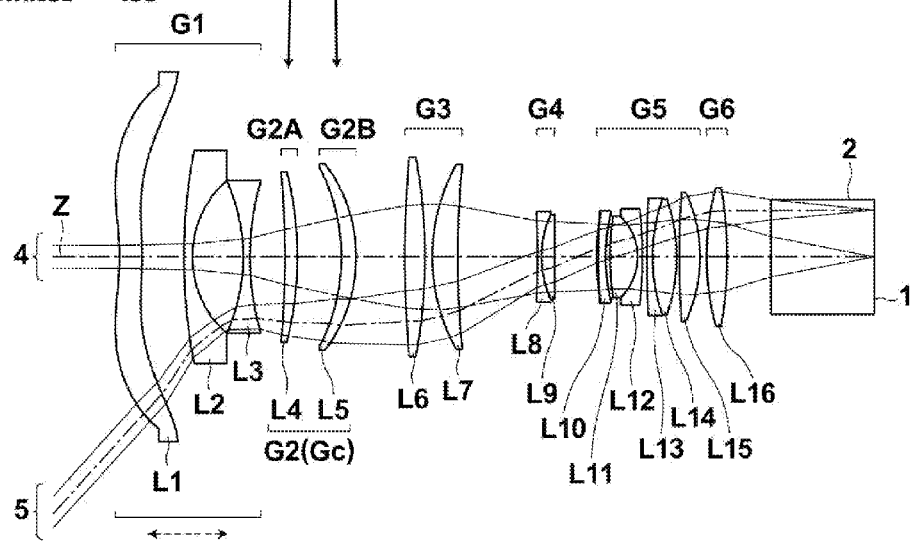
FIG.10

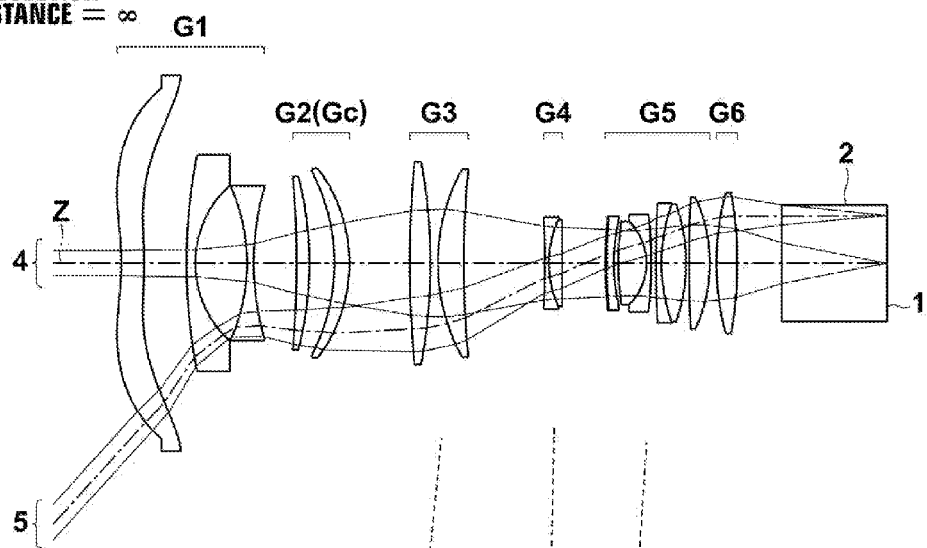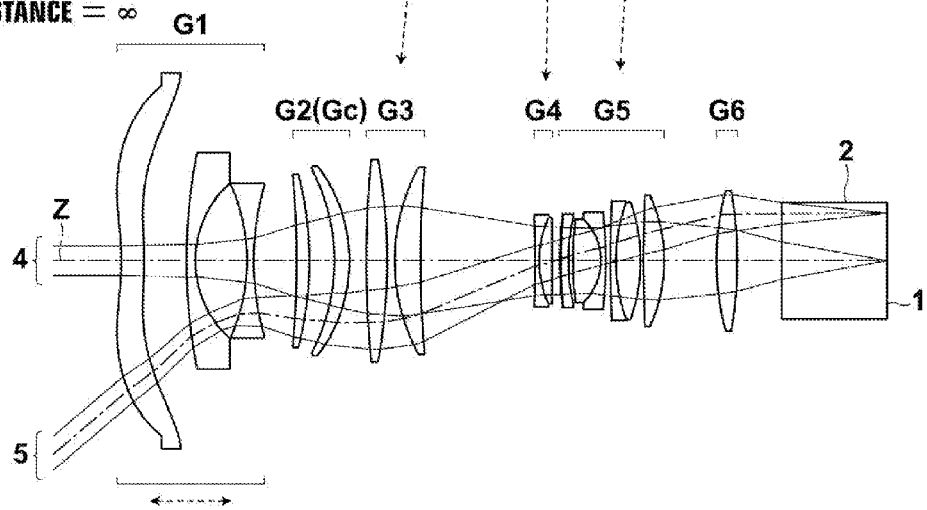
FIG. 11

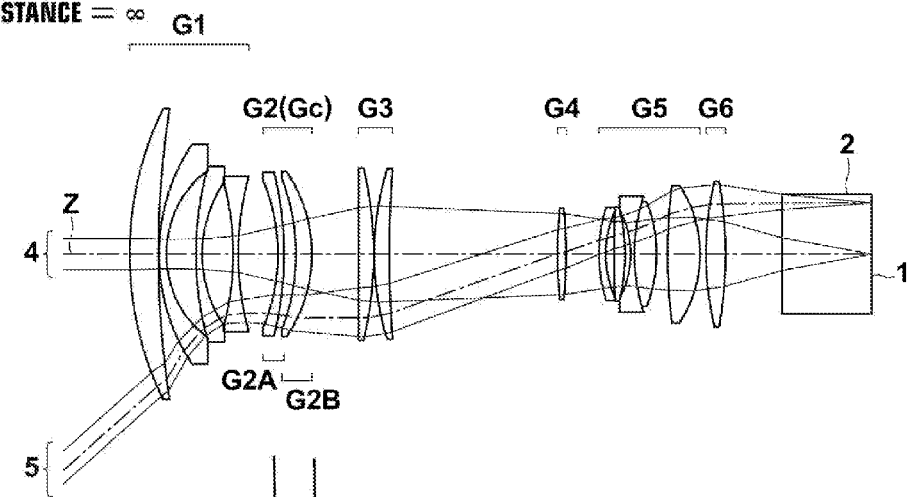
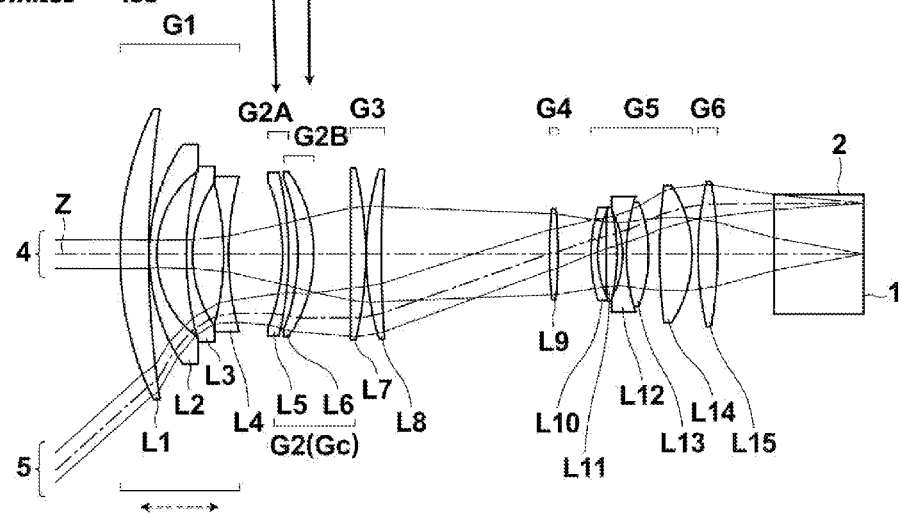
FIG.12 EXAMPLE 5

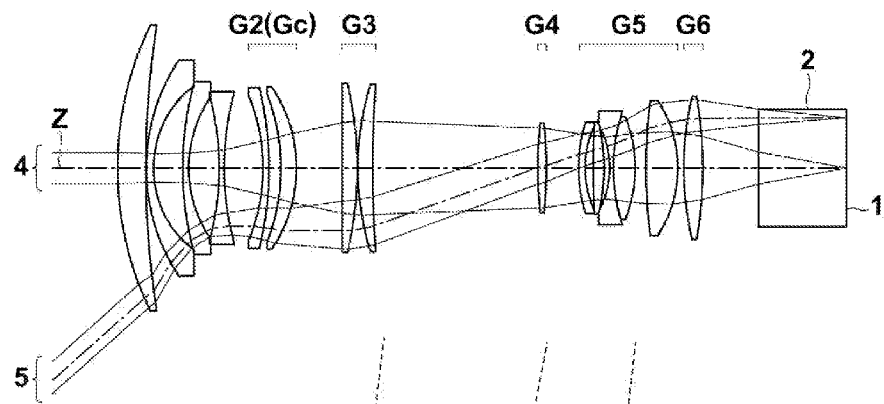
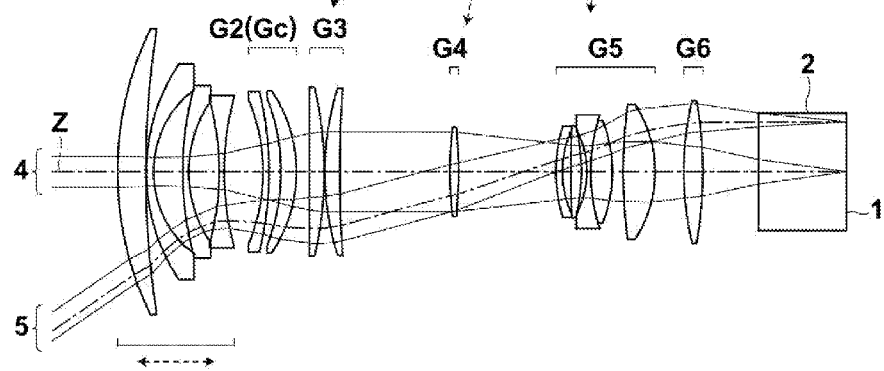
FIG.13

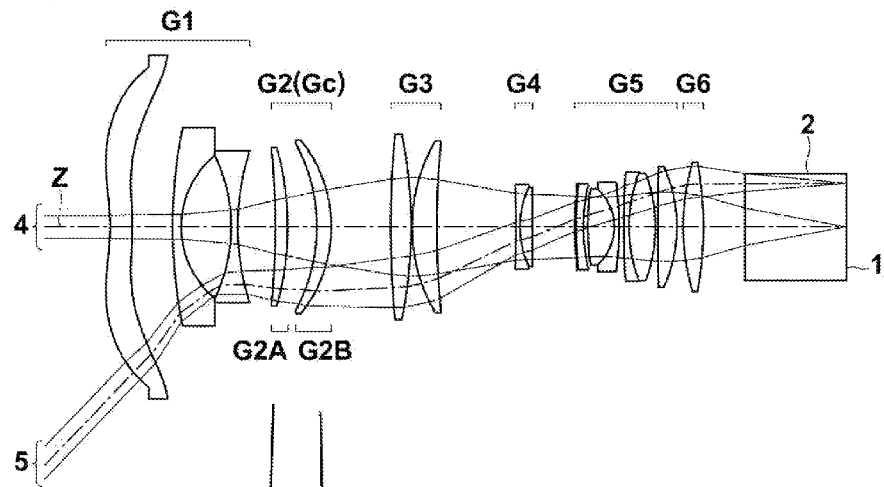
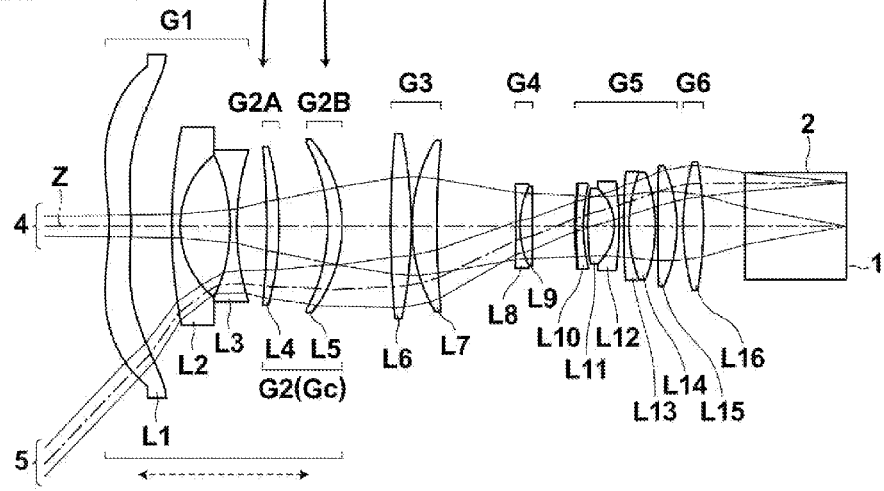
FIG.14

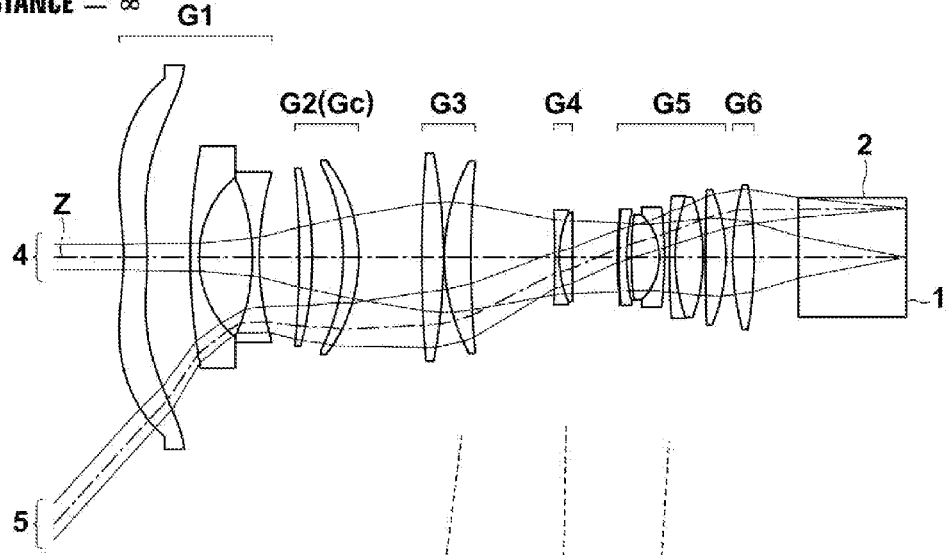
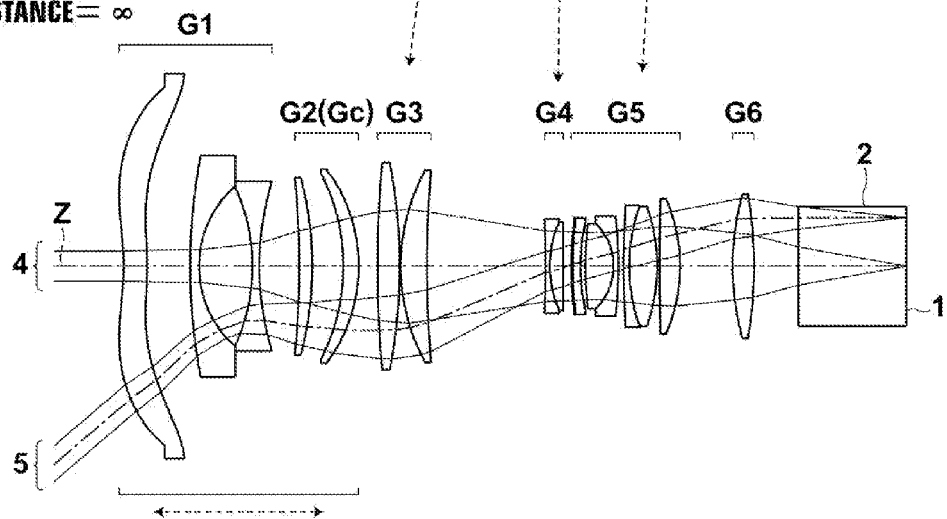
FIG.15

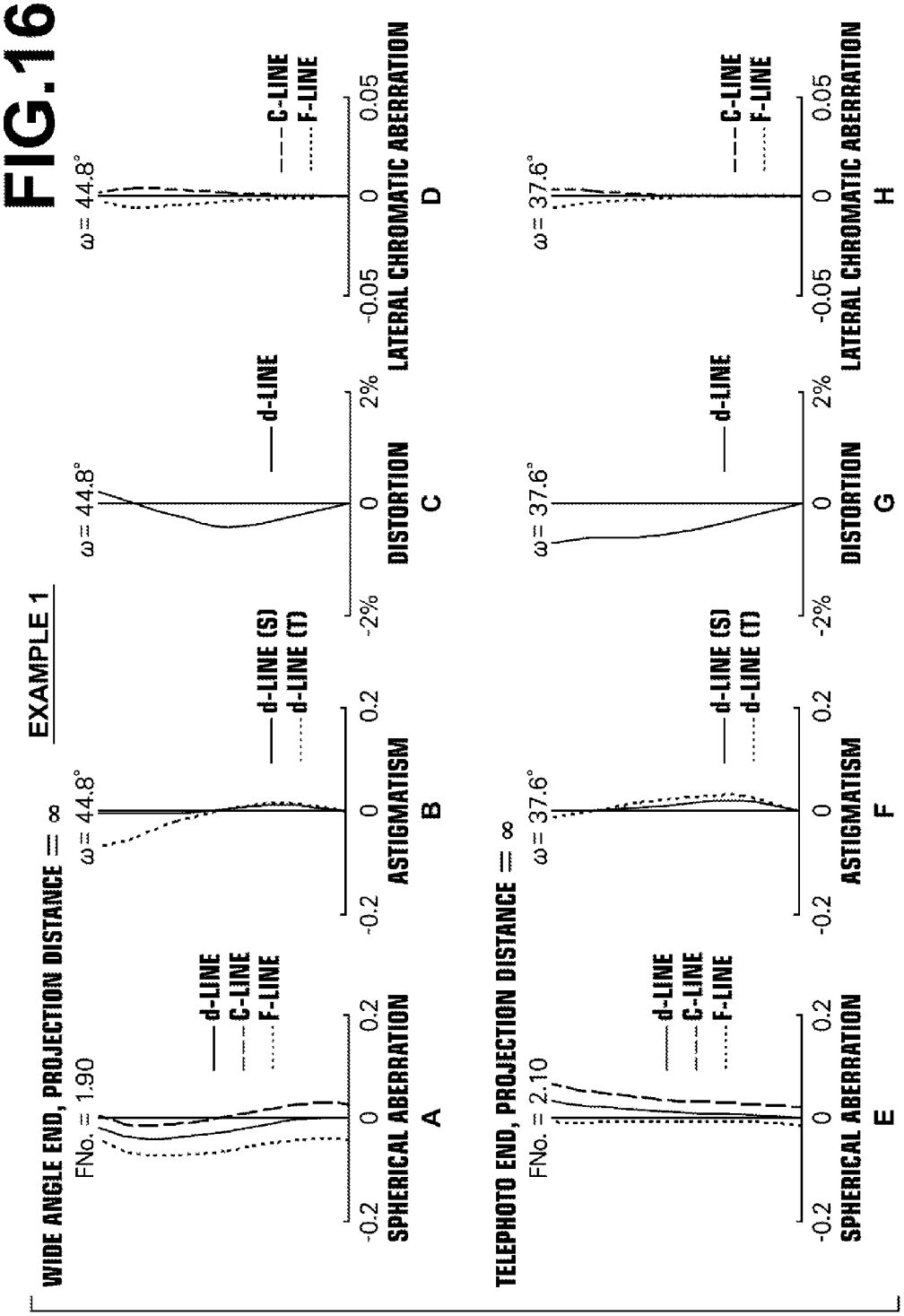

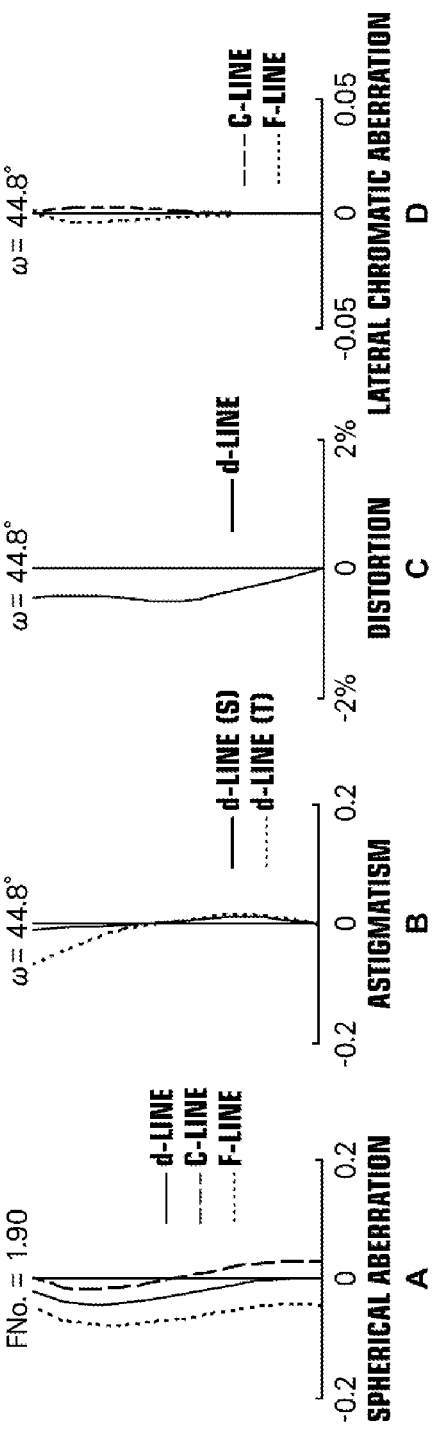
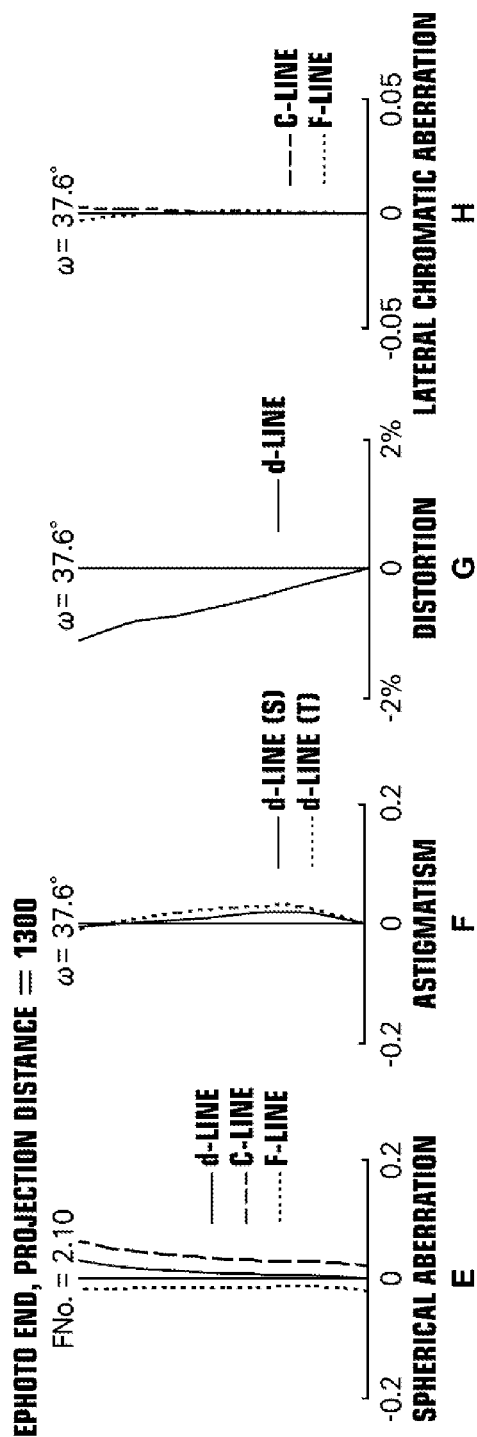
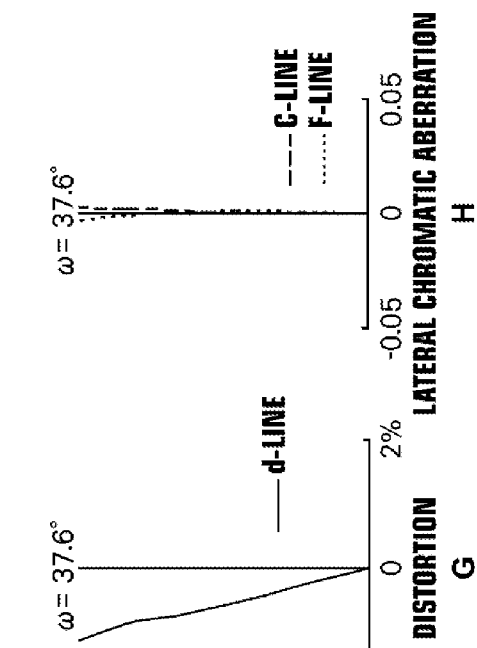
FIG.17 EXAMPLE 1

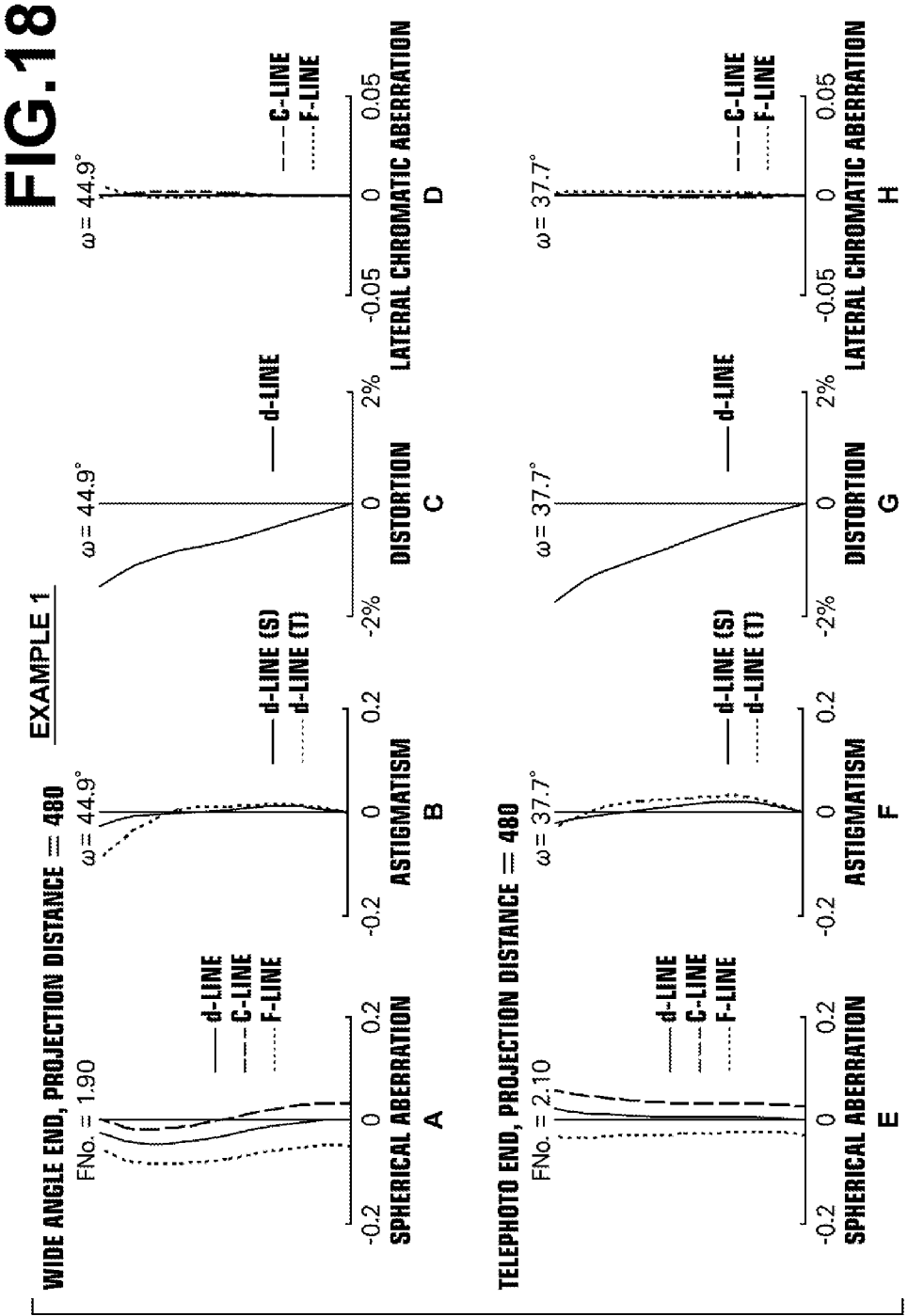

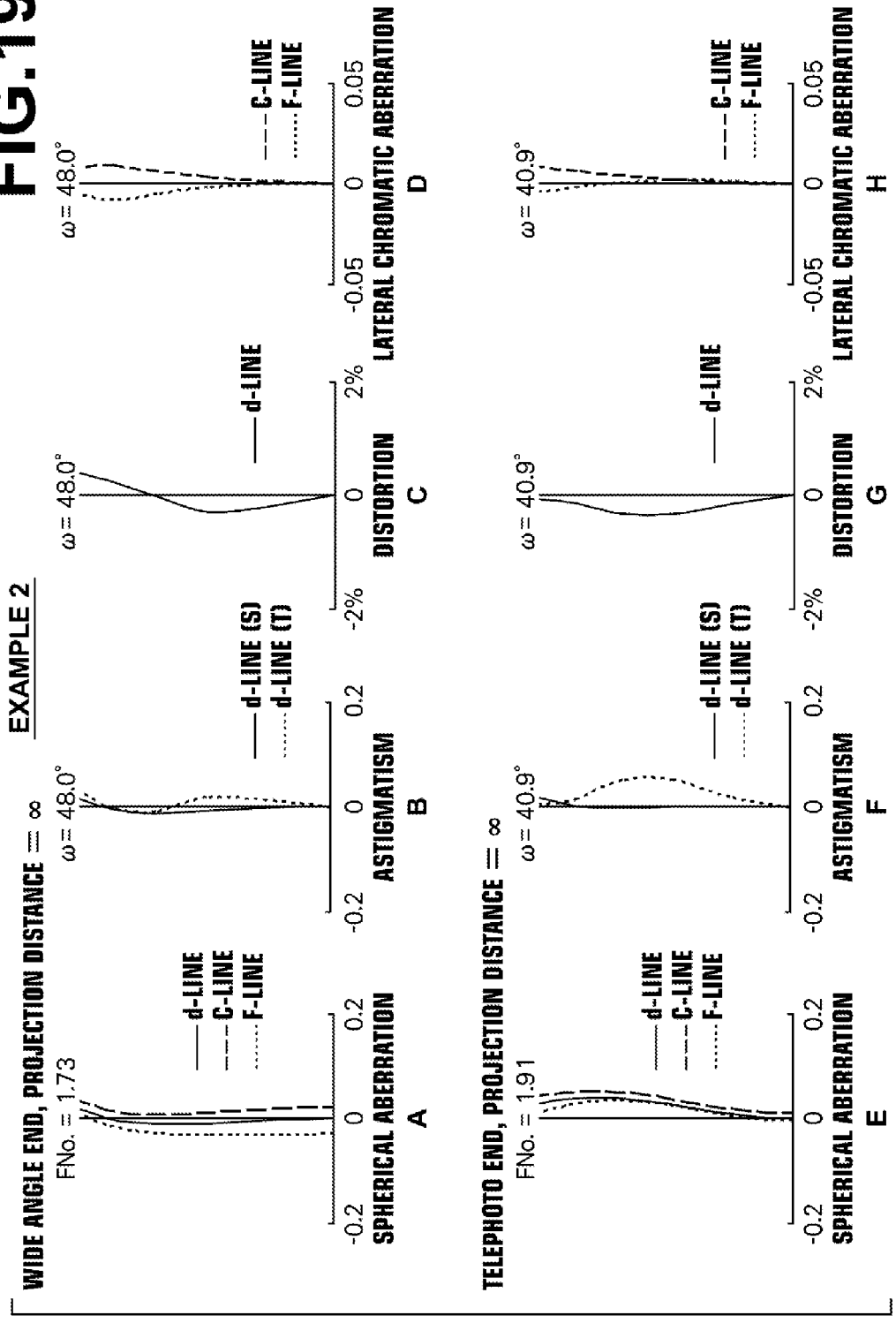

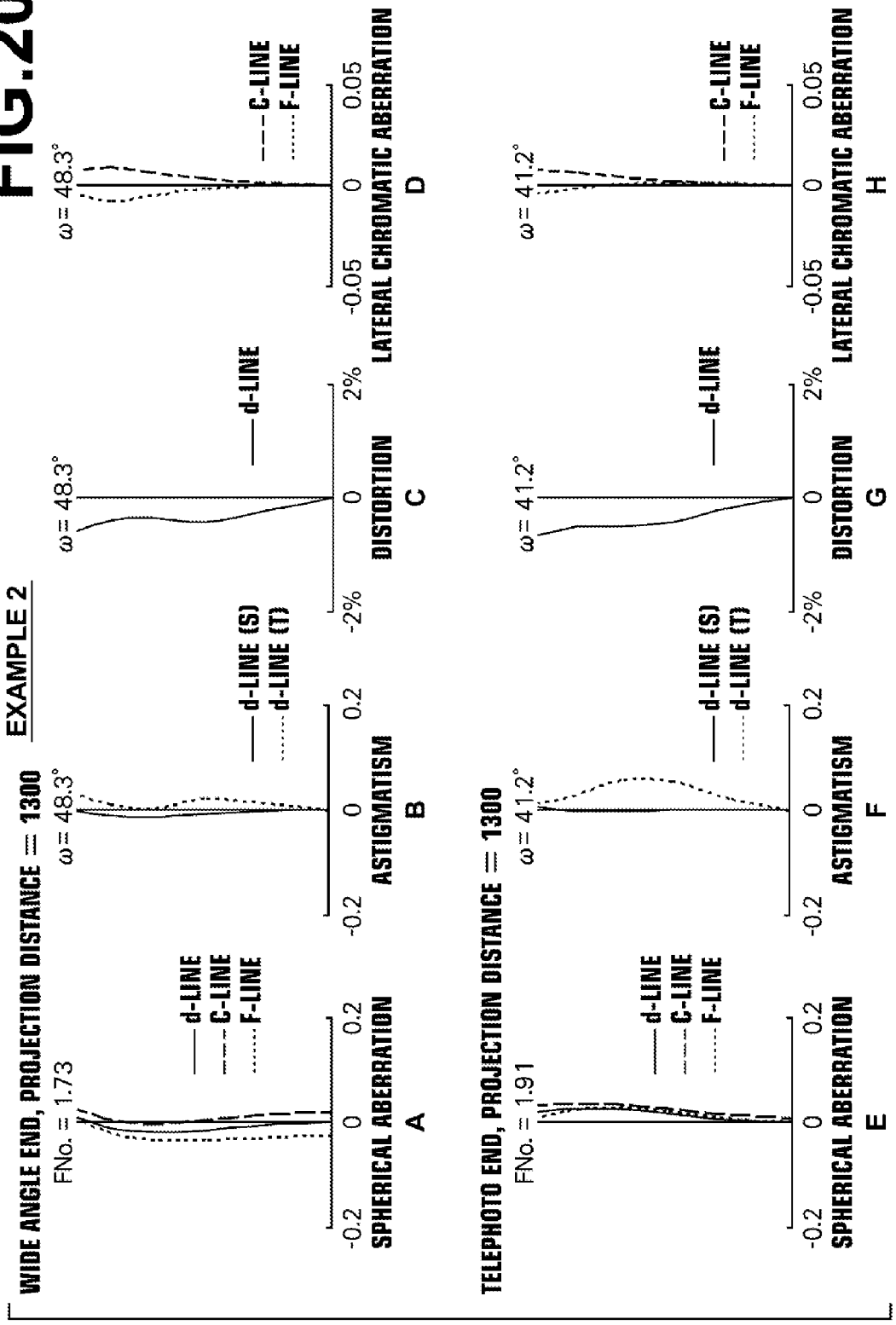

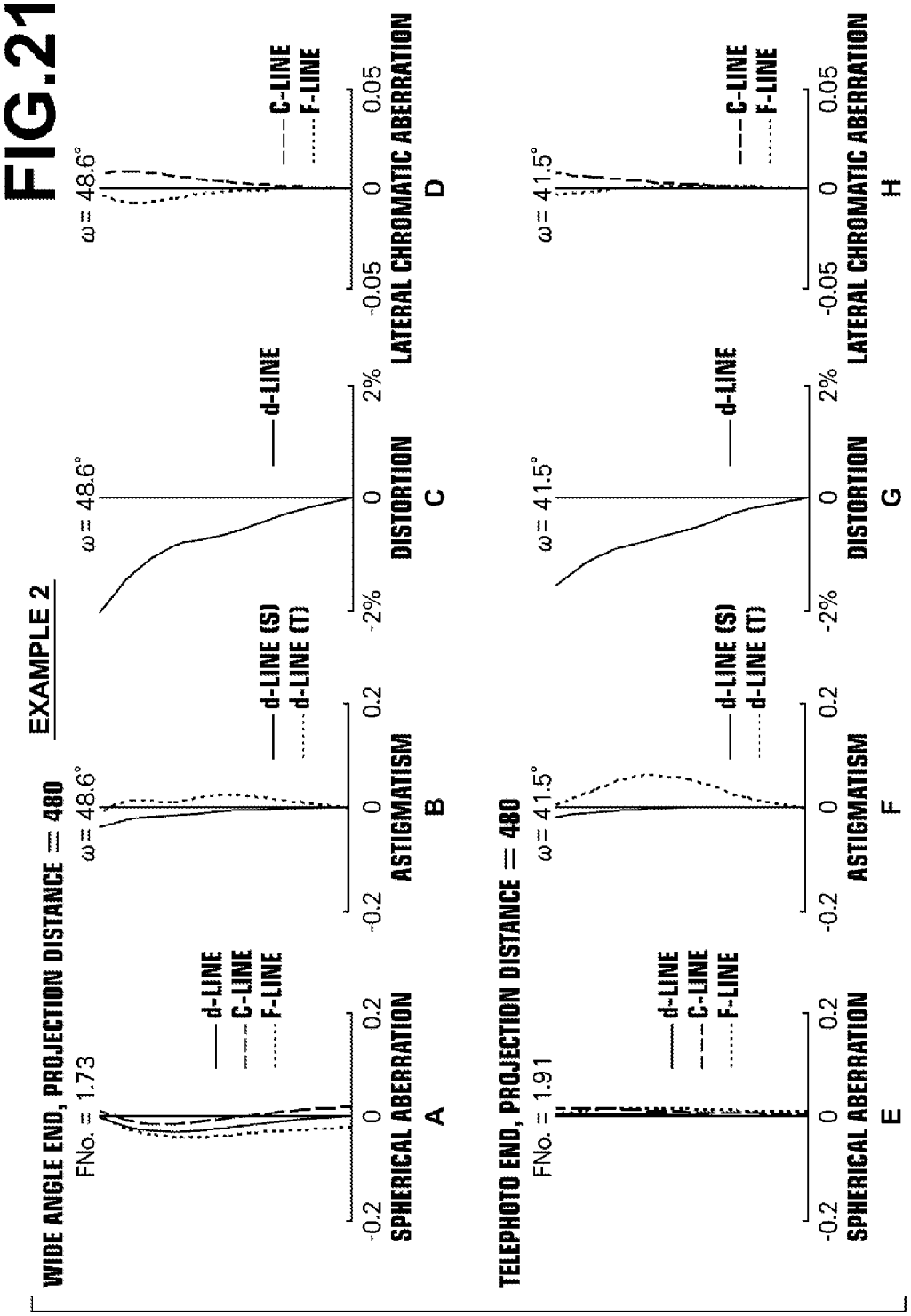

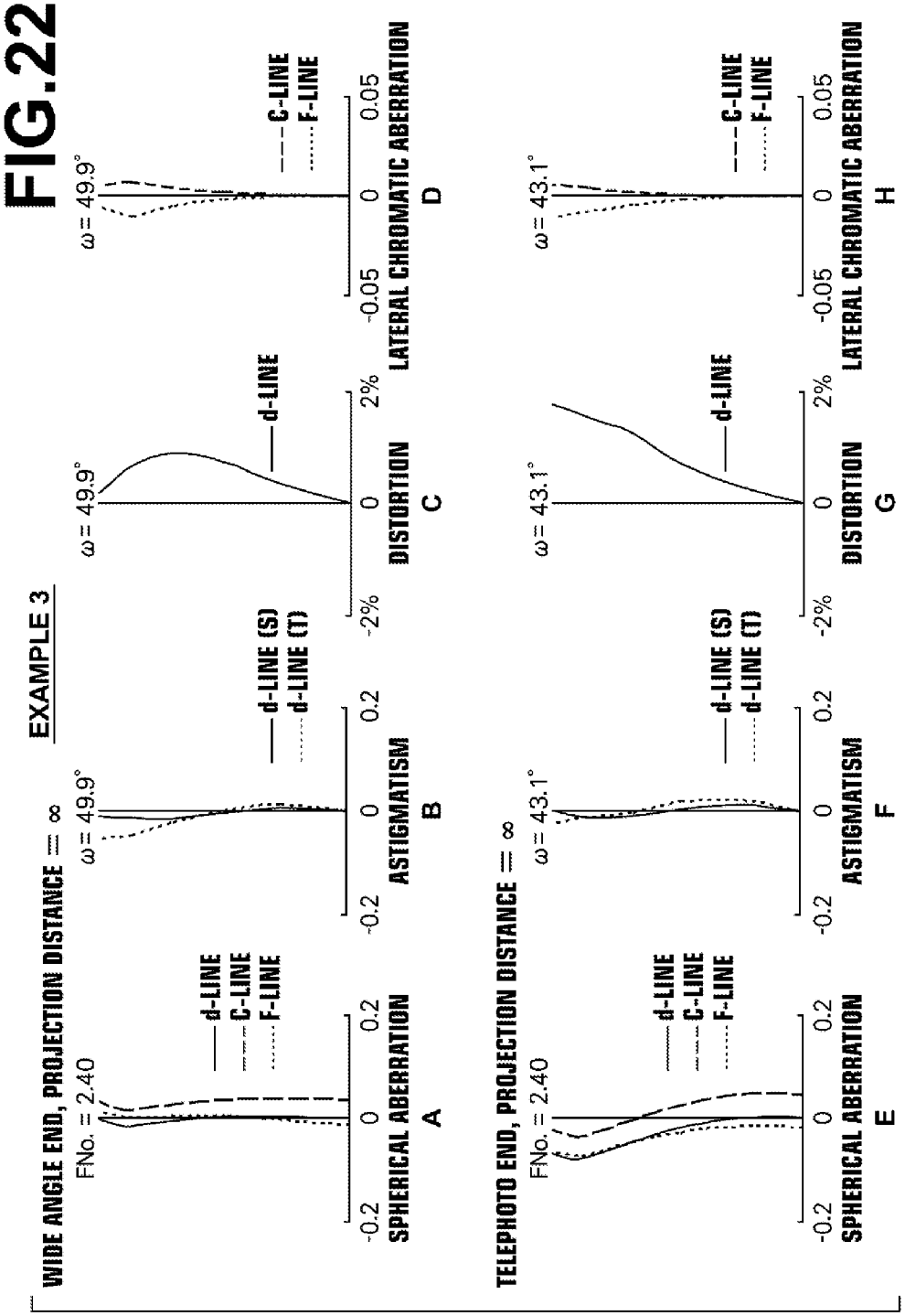

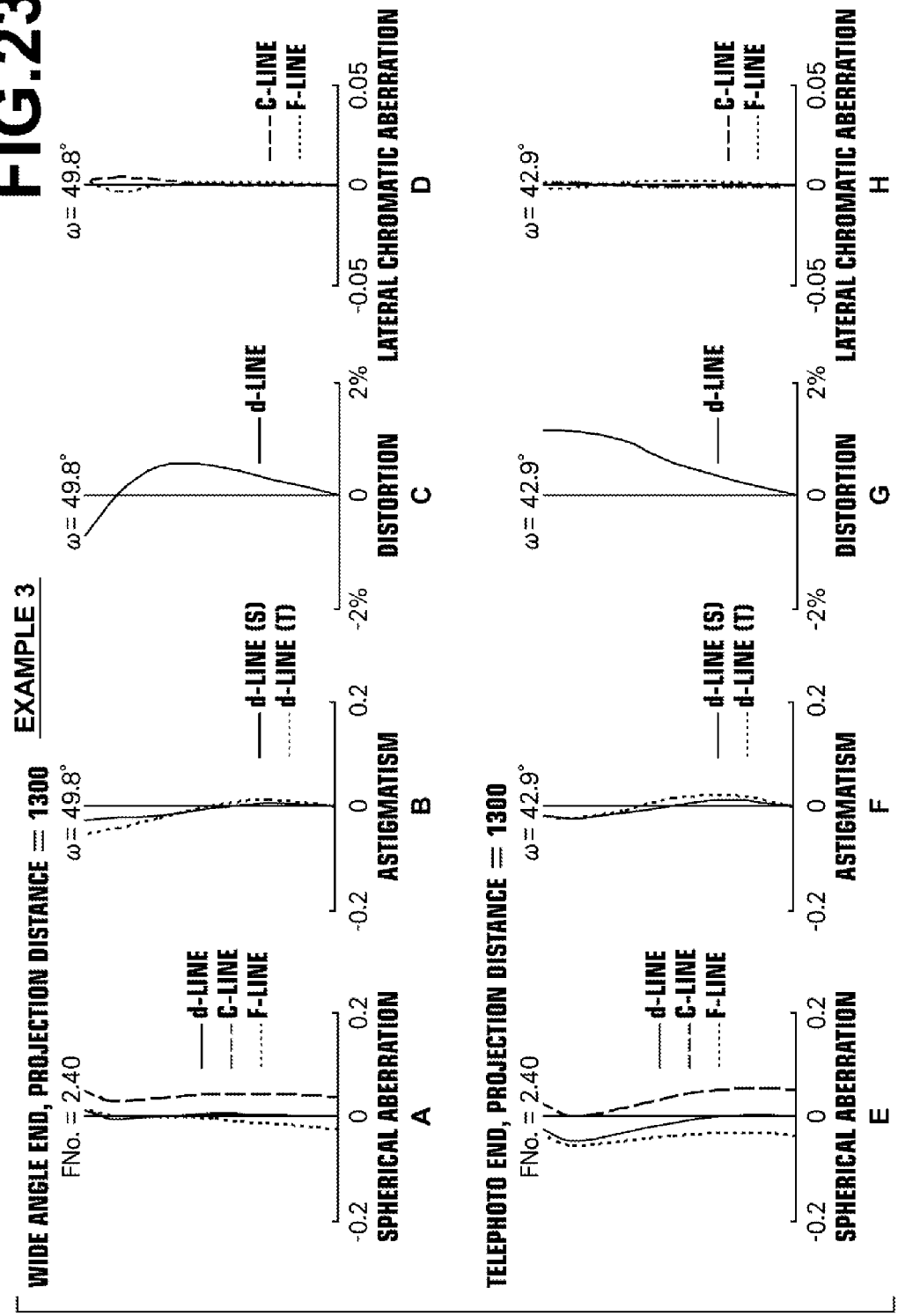

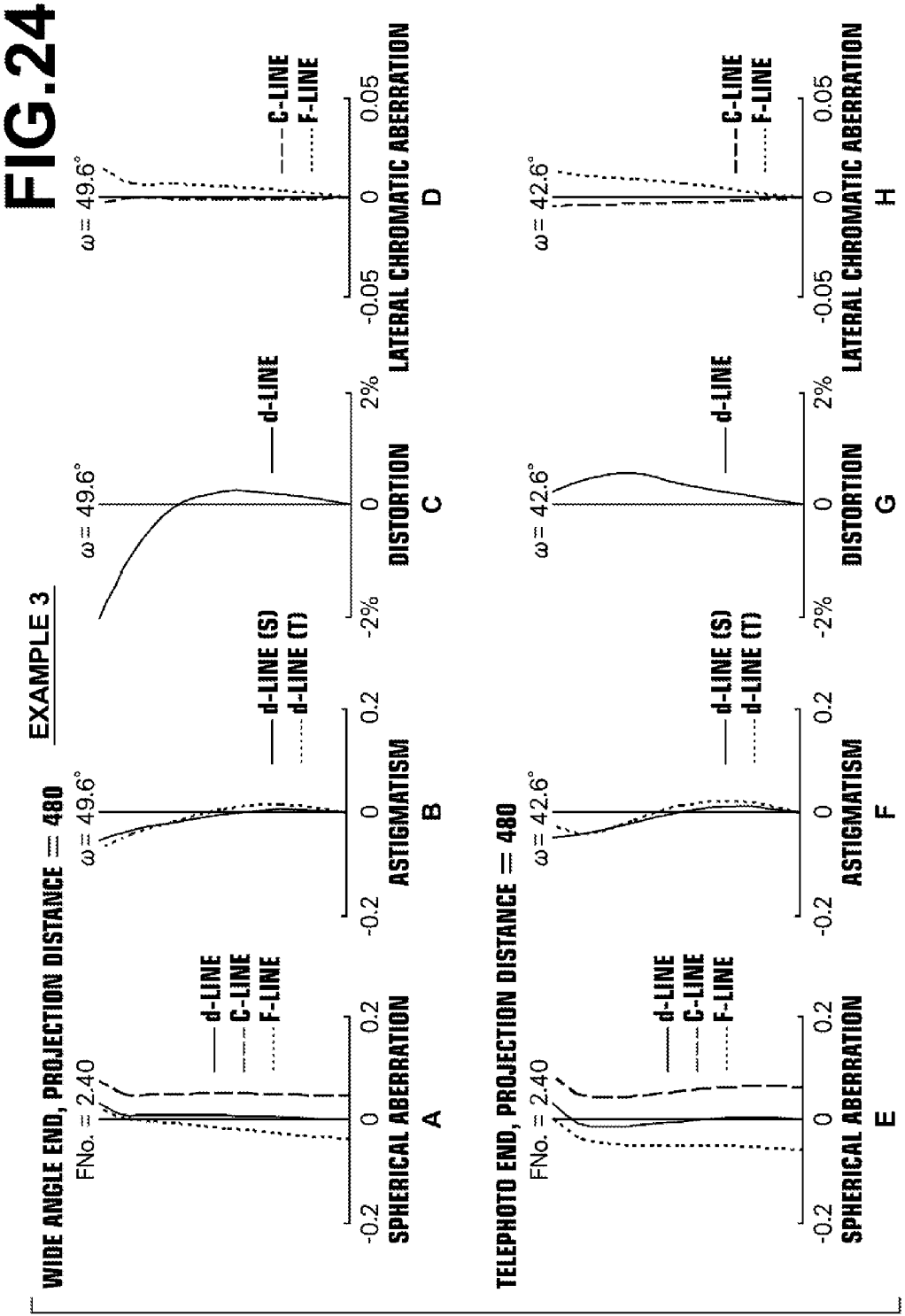

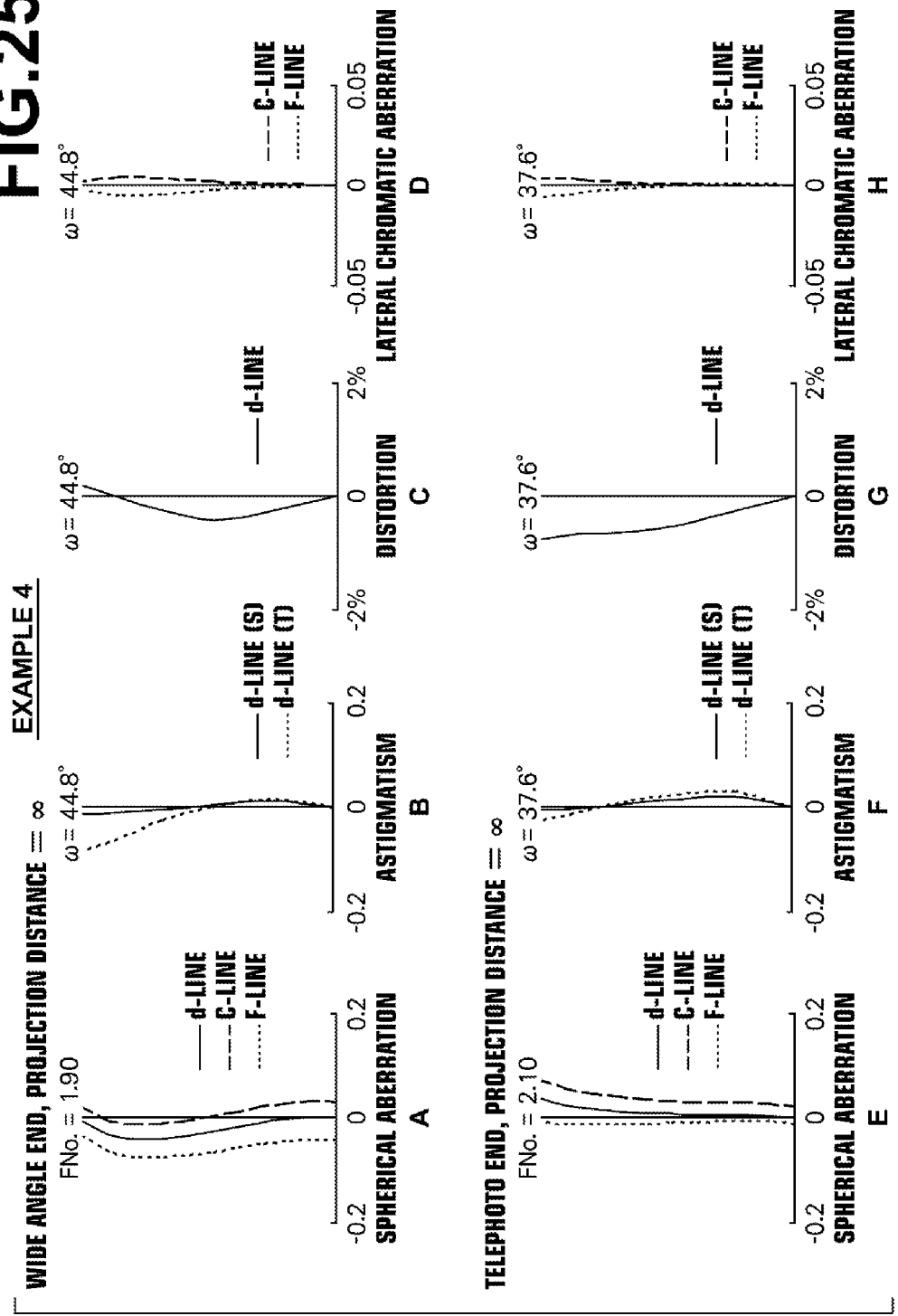

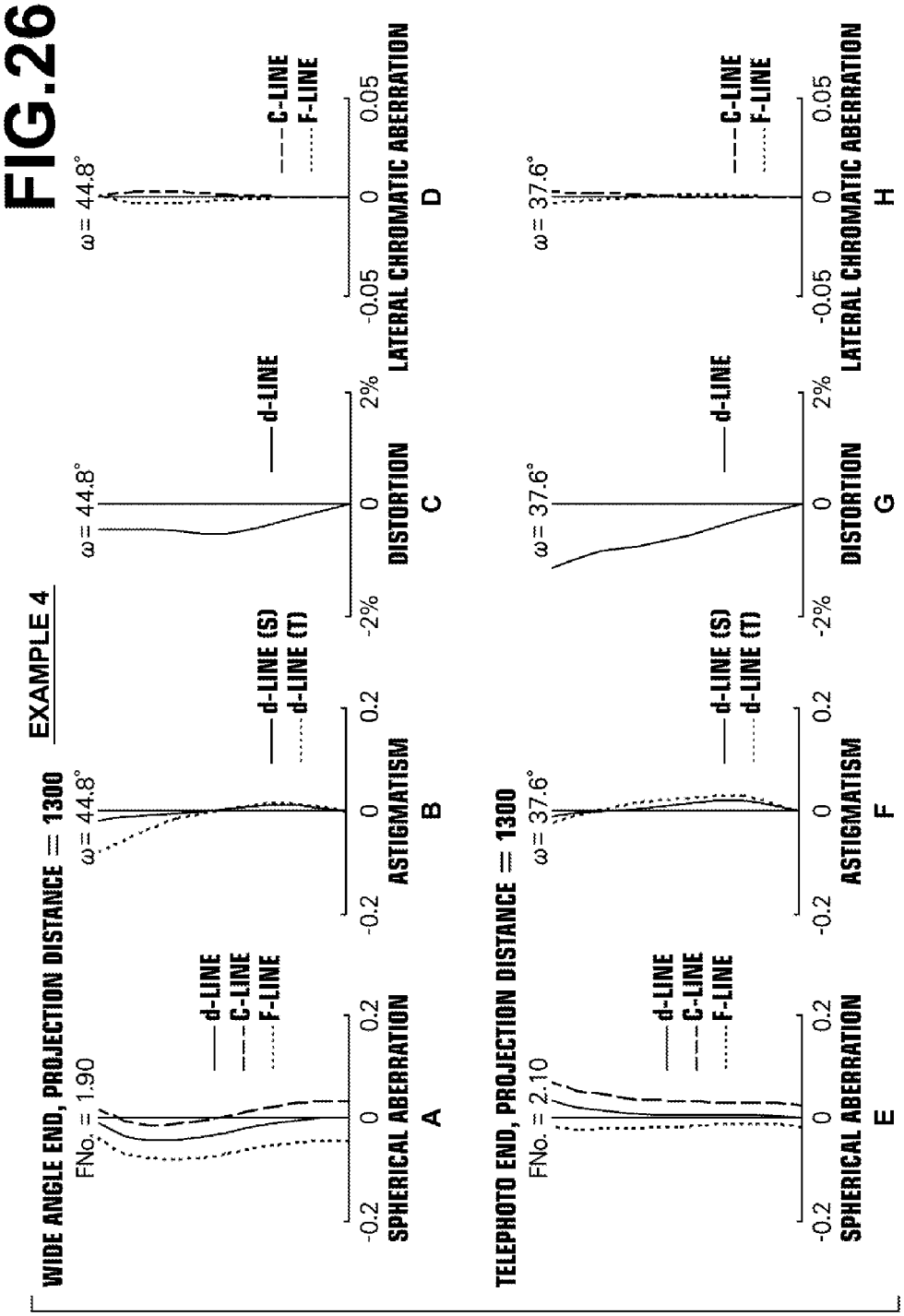

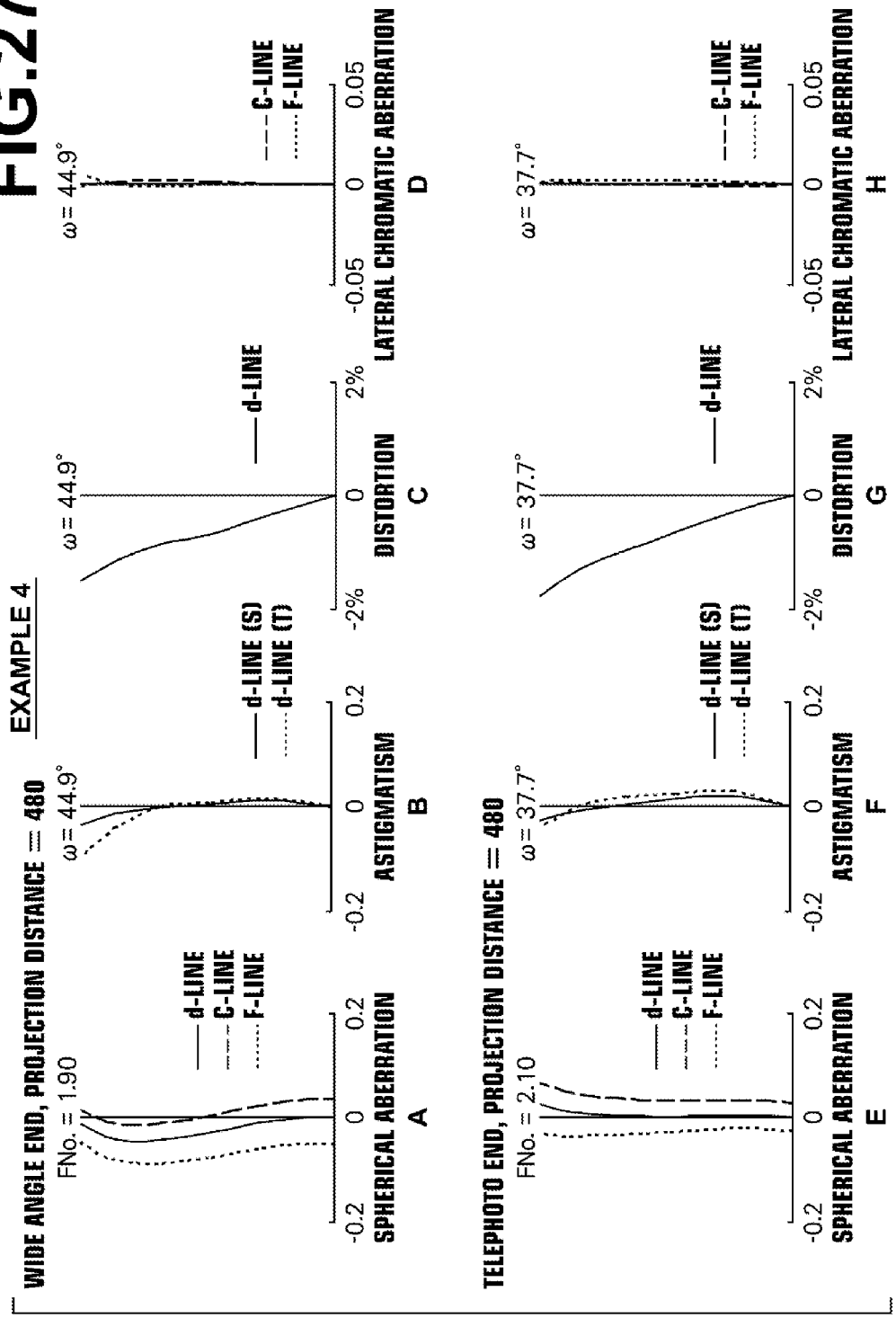

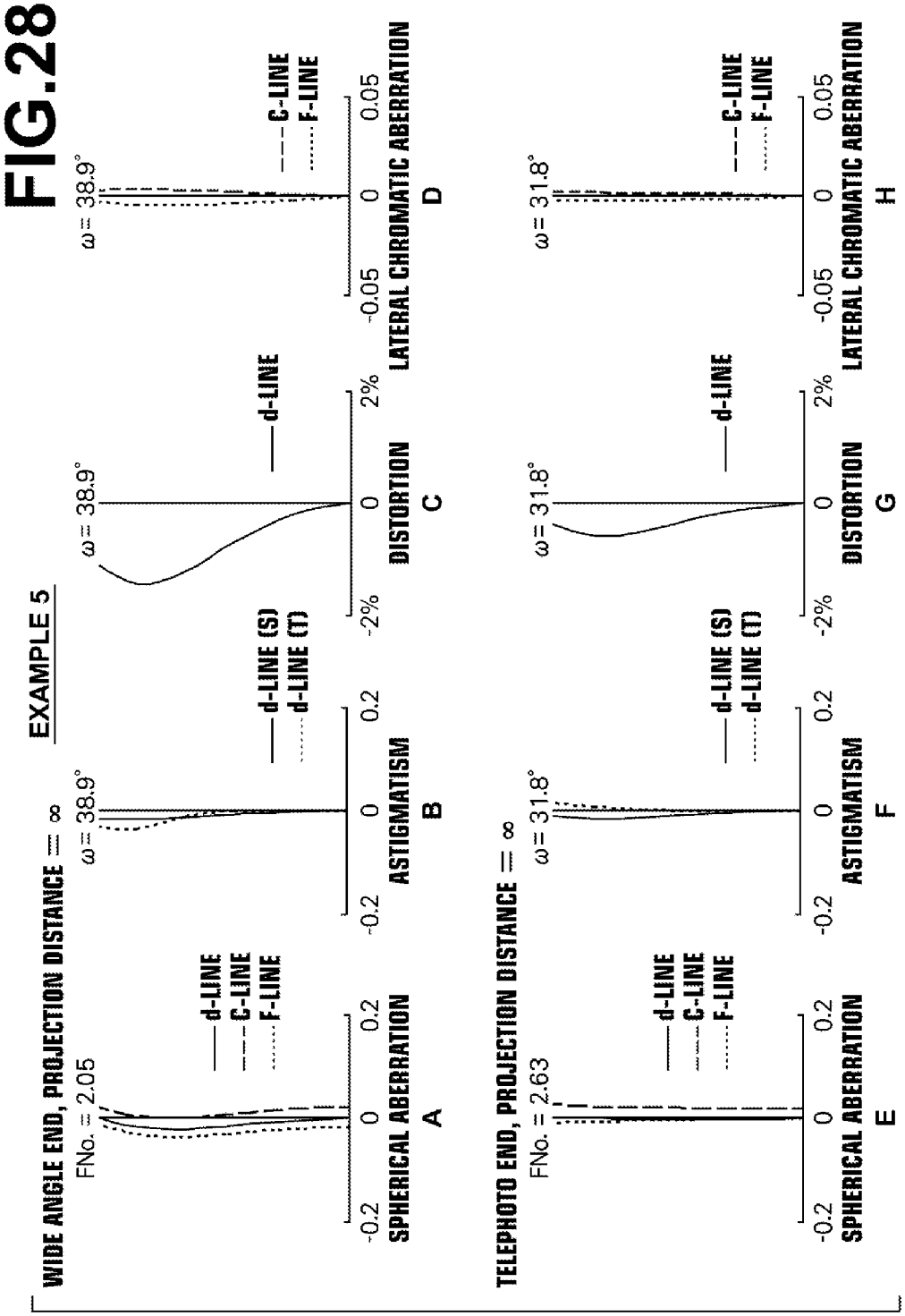

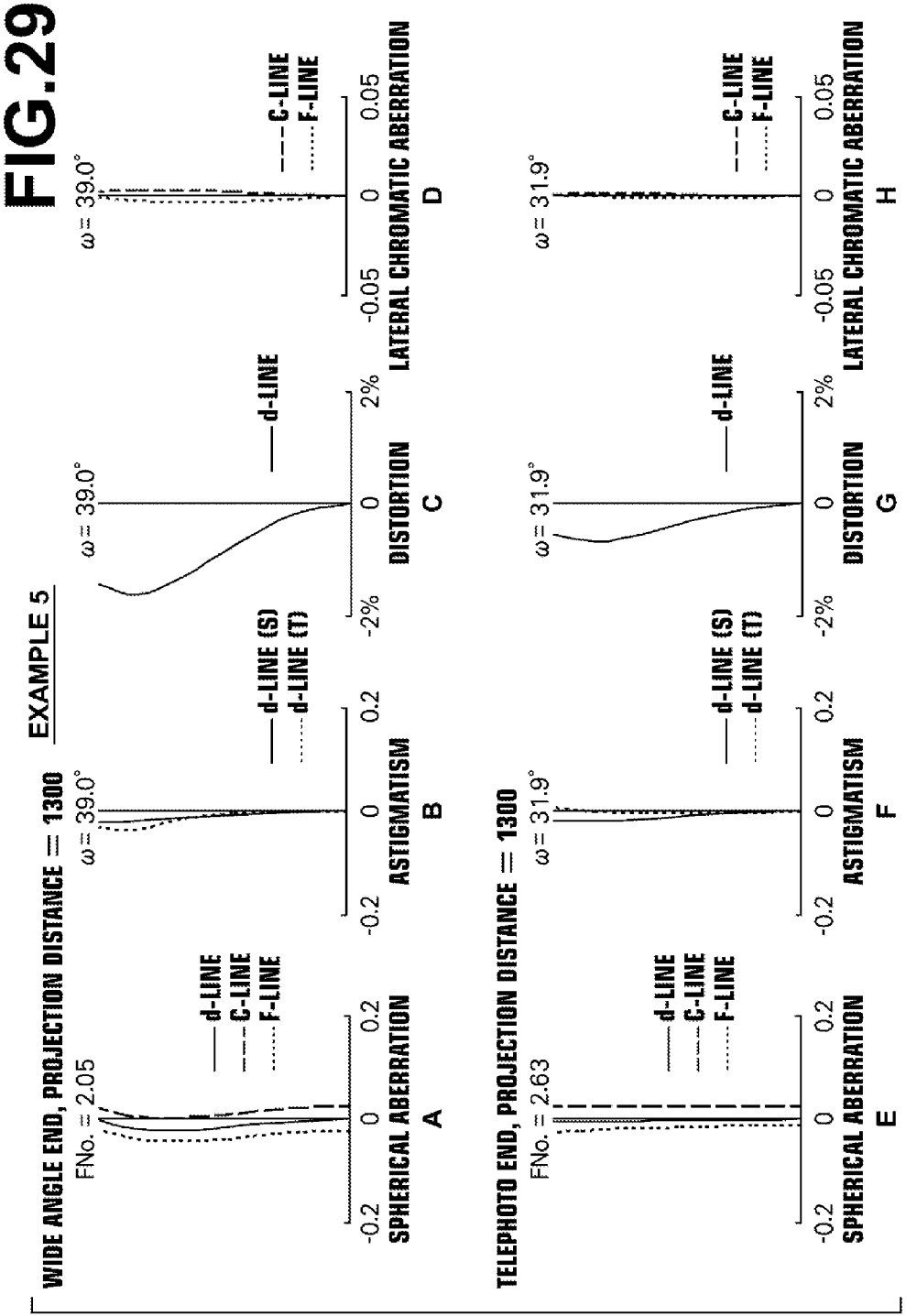

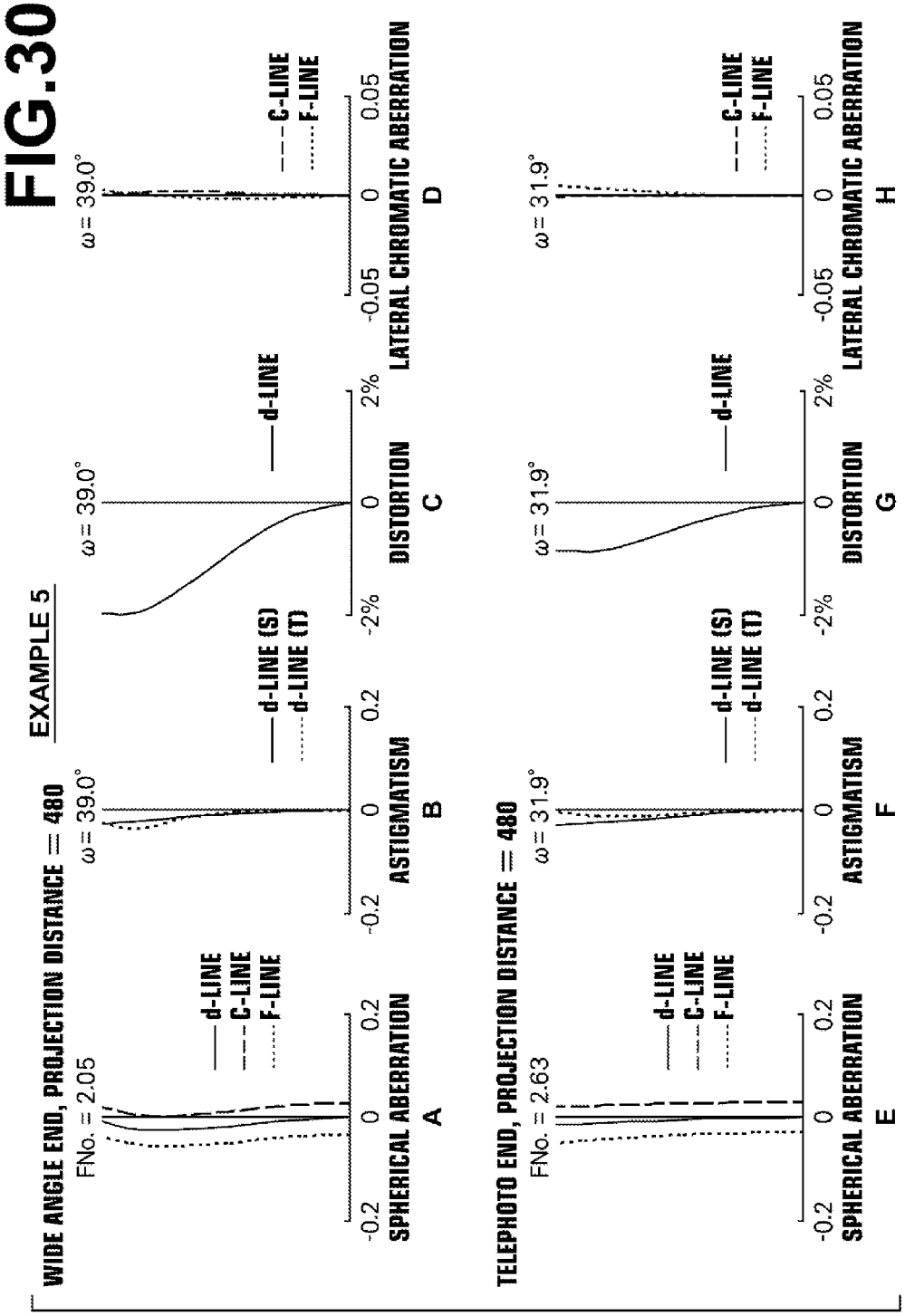

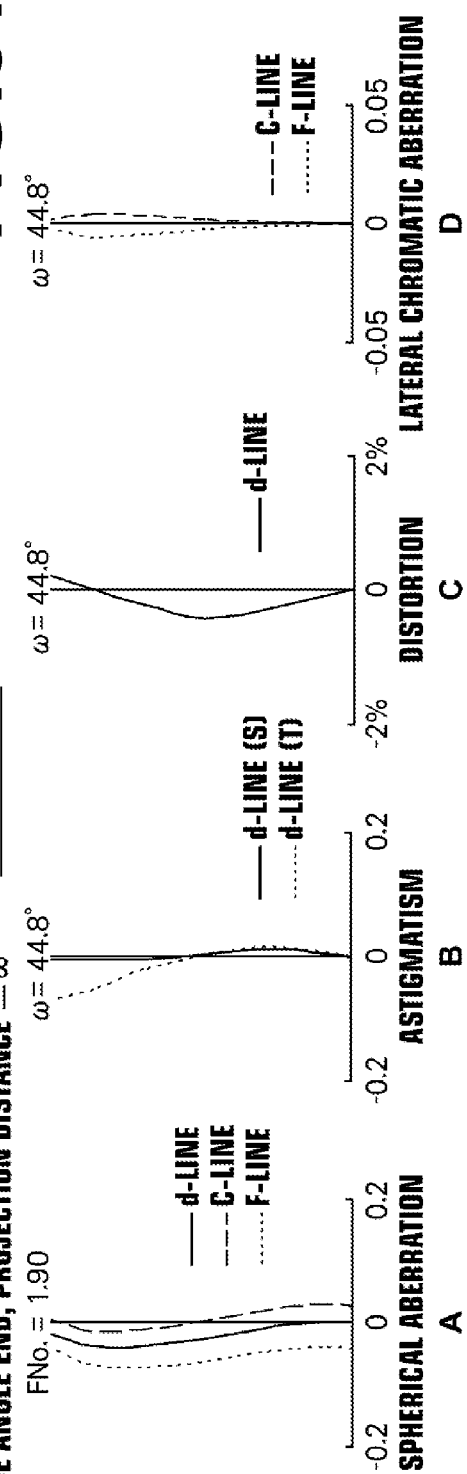

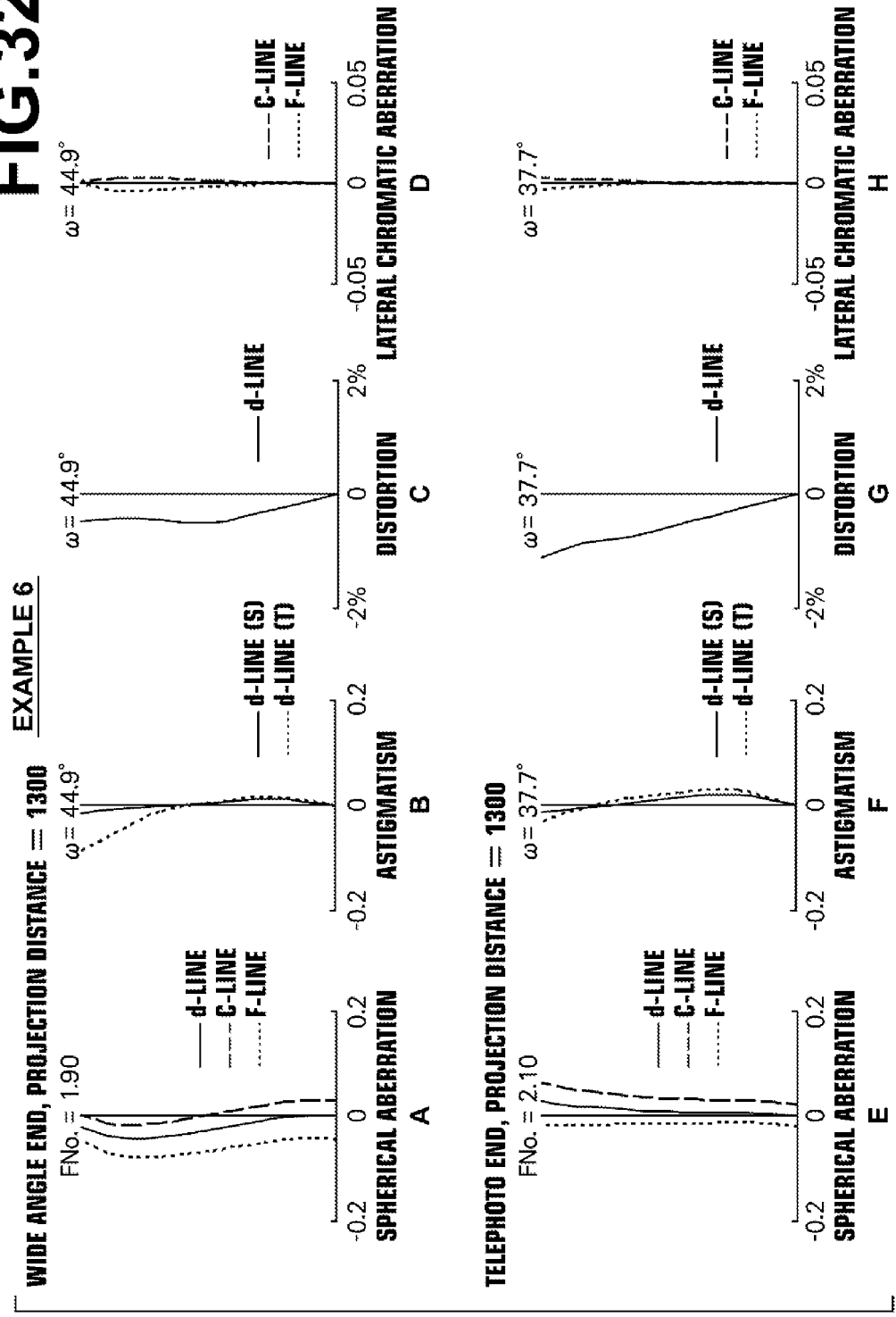

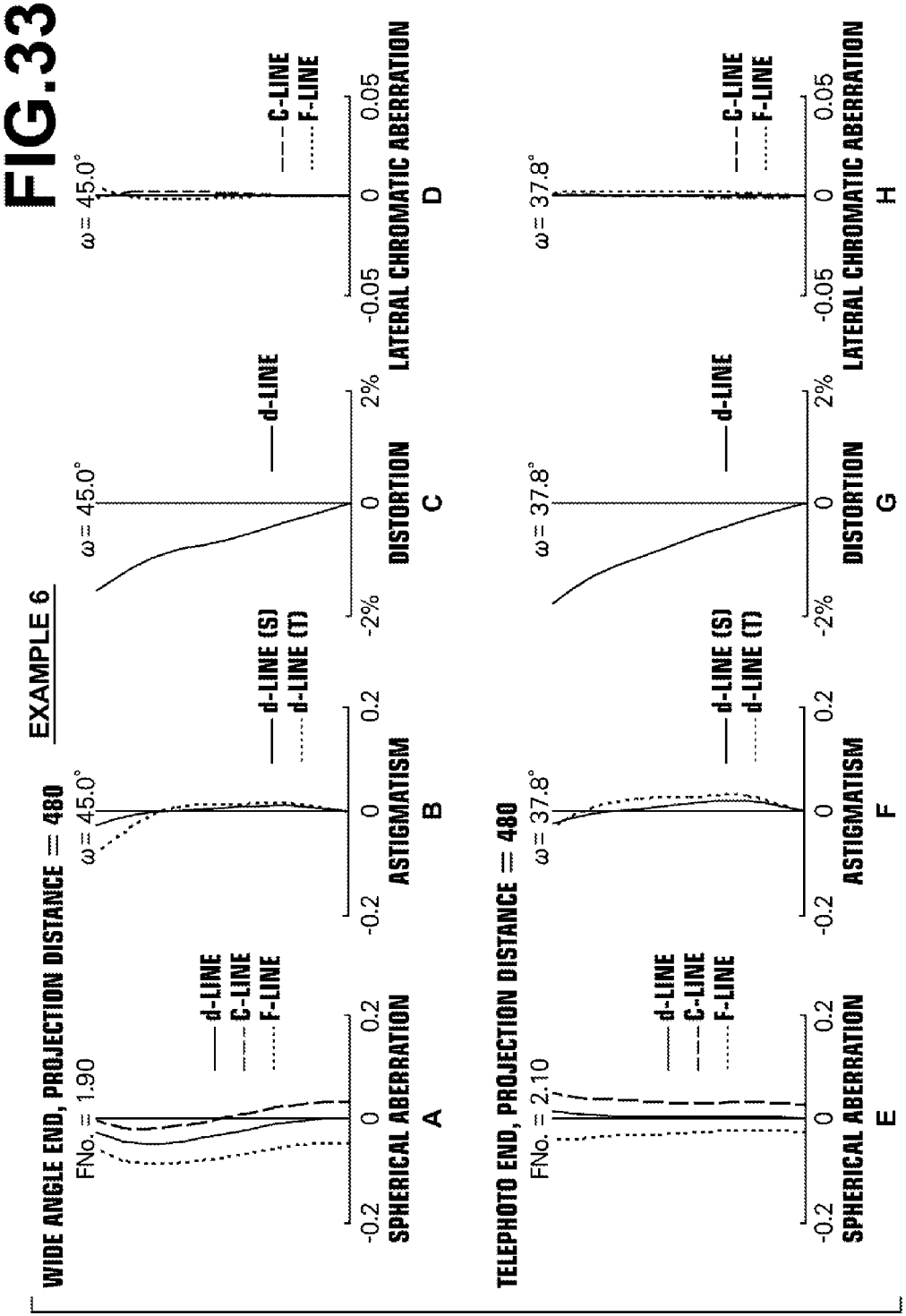

PROJECTION LENS AND PROJECTION DISPLAY APPARATUS

CROSS-REFERENCE TO RELATED APPLICATIONS

The present application claims priority under 35 U.S.C. §119 to Japanese Patent Application No. 2013-114972 filed on May 31, 2013. Each of the above application(s) is hereby expressly incorporated by reference, in its entirety, into the present application.

BACKGROUND OF THE INVENTION

1. Field of the Invention

The present invention relates to a projection lens and a projection apparatus, and more particularly to a projection lens suitable for magnifying and projecting an original image formed, for example, by a light valve and a projection apparatus using the same.

2. Description of the Related Art

Heretofore, projection display devices (projectors) that magnify and project images displayed on image display surfaces of light valves, such as liquid crystal display devices, DMDs (Digital Micro-mirror Device: registered trade mark), and the like, have been used when conducting presentations or the like. As for the lenses used in the projection display devices, wide angle lenses are in high demand because large screen sizes with short projection distances are often required. Further, there is a tendency that zoom lenses are preferred as the screen size needs to be adjustable with a high degree of freedom under limited installation conditions. As a wide angle projection zoom lens, for example, the lens described in Japanese Unexamined Patent Publication No. 2009-251316 may be cited.

Further, in the projection display devices, it is required that the quality of the projected image does not change largely when the projection distance is changed. Japanese Unexamined Patent Publication No. 2008-257005 describes a projection zoom lens whose object is to correct variation in the field curvature when the projection distance is changed. Japanese Unexamined Patent Publication No. 2011-145580 described a projection display apparatus whose object is to obtain an image which is in focus in a wide range through the projection onto a spherical or curved projection surface and the degree of curvature of the image surface due to field curvature is performed adjustable by changing the distance between two lens groups.

SUMMARY OF THE INVENTION

When the projection distance is changed, focusing is generally performed by driving a focusing mechanism in which some of the lens groups called a focusing group or the entire lens system is moved in an optical axis direction. The focusing operation is to bring the positional relationship between the image display surface of the light valve and the screen into a conjugate positional relationship with respect to the projection lens, and generally the reduction side conjugate position corresponds to the position of the image display surface of the light valve and the magnification side conjugate position corresponds to the position of the screen. The change in the projection distance described above corresponds to the change in the distance from the projection lens to the magnification side conjugate position.

For the distance from the projection lens to the reduction side conjugate position, it is necessary to consider a fastening error that occurs between the device mechanism and the fastening portion of the projection lens, that is, it is necessary to consider the error in the distance between the image display surface of the light valve and the projection lens. For example, this is an unavoidable manufacturing error that occurs between the device mechanism and fastening portion of the projection lens in the manufacture of a projection display device. There may be a case in which the error is minimized by calibrating the position of the image display surface with respect a specific projection lens. But, if a plurality of types of lenses is used for one projection display device through replacement, it is difficult to avoid the fastening error.

As recent projection display devices have made a progress in brightness and the lenses need to have small F-numbers, in addition to higher definition light valves, it is difficult to absorb the fastening error by the depth of focus of the projection lens and a means for absorbing the fastening error is indispensable. Further, in the case in which a plurality of lenses is used through replacement, the means for absorbing the fastening error needs to be simple, since the replacement of the lenses is mostly carried out by the end user. Under these circumstances, it has been often the case that the fastening error is absorbed by driving the focusing mechanism in the past. But, as the focusing mechanism is originally provided to accommodate change in the projection distance, the use of the focusing mechanism for absorbing the fastening error may cause troubles described herein below, which is more significant, in particular, in wide angle lenses.

From the viewpoint that the same device is used, if a comparison is made among the lenses having the same image circle, the focal length becomes shorter for a wider angle lens. As the amount of change in the reduction side conjugate position is proportional to the reduction ratio and the focal length when the magnification side conjugate point is changed from infinity to proximity, the amount of change in the reduction side conjugate position is smaller for a wider angle lens if the reduction ratio, i.e., the projected screen size is the same.

As the fastening error occurs regardless of the focal length of the lens, if the fastening error is tried to be absorbed by operating the focusing mechanism of a wide angle lens, the ratio of the movable amount of the focusing mechanism required for absorbing the fastening error is high with respect to the movable amount of the focusing mechanism for accommodating the usable projection distances. This may cause that the lens cannot be brought into focus when the magnification side conjugate position is in proximity or in remote, or the movable amount of the focusing mechanism is increased largely for absorbing the fastening error in addition to the movable amount of accommodating the usable projection distances, thereby resulting in too sensitive focus and difficulty in focusing.

Further, it is generally known that the field curvature of wide angle lenses varies when the projection distance is changed and designs for inhibiting this have been made and various focusing methods, including the floating and the like, have been devised. That is, the wide angle lens designed to prevent variation in the field curvature due to change in the projection distance will accompany a small change in the reduction side conjugate point and a large change in the field curvature at the time of focusing. If the focusing mechanism of such a wide angle lens is driven for absorbing the fastening error, therefore, the position of the focusing group or the entire lens system differs largely from the design position for accommodating the change in the projection distance and field curvature occurs.

As described above it is required for projection lenses, in particular, wide angle projection lenses, not only to correct field curvature when the projection distance is changed but also to inhibit variation in field curvature when fastening error is absorbed. If variation in the point of focus, i.e., defocusing occurs after field curvature is corrected, and the correction operation of field curvature and the focusing operation need to be repeated many times, the correction status of the field curvature becomes difficult to understand and the focusing operation becomes very complicated, so that it is preferable that the defocusing does not occur at the time of correcting field curvature.

Japanese Unexamined Patent Publication No. 2008-257005 and Japanese Unexamined Patent Publication No. 2011-145580 described above do not give any consideration to the fastening error described above. The technology described in Japanese Unexamined Patent Publication No. 2008-257005 is related to the field curvature correction at the time of focusing and, therefore, the correction of field curvature and focusing cannot be performed independently. Consequently, if the defocusing due to the fastening error is adjusted by the focusing mechanism, variation in the field curvature will occur. Japanese Unexamined Patent Publication No. 2011-145580 describes that the focus position is adjusted after field curvature is corrected by a focus position adjusting mechanism provided separately from the field curvature correcting mechanism and, thus, the defocusing due to the correction of field curvature is assumed.

The present invention has been developed in view of the circumstances described above, and it is an object of the present invention to provide a projection lens in which both field curvature correction when the projection distance is changed and inhibition of variation in the field curvature when absorbing fastening error are allowed to be performed independently of magnification changing operation and focusing operation, and practically no defocusing occurs after correction of field curvature. It is a further object of the present invention to provide a projection display apparatus equipped with the projection lens.

A projection lens of the present invention is a projection lens having a positive refractive power as a whole and including a correction group consisting of a plurality of lens groups that corrects field curvature by moving in an optical axis direction and changing the distance between each lens group, wherein:

the conjugation length of a combined optical system combining the most magnification side lens group constituting the correction group to the most reduction side lens group constituting the correction group in the projection lens is constant before and after the movement of the correction group for correcting field curvature; and if the projection lens is variable in magnification or focusable by moving at least some of the lens groups, the movement of the correction group for correcting field curvature is allowed to be performed independently of the movement for either changing magnification or focusing.

The projection lens of the present invention preferably satisfies a conditional expression (1) given below, more preferably satisfies a conditional expression (1') given below, and further preferably satisfies a conditional expression (1") given below:

$$0.50 < \beta < 3.00 \tag{1}$$

$$0.50 < \beta < 2.50 \tag{1'}$$

$$0.70 < \beta < 2.00 \tag{1''}$$

where $\beta$ is the magnification ratio of the combined optical system in the projection lens and, if the projection lens is focusable, $\beta$ is the magnification ratio under the state in which the magnification side conjugate position is at infinity.

In the projection lens of the present invention, the lens groups constituting the correction group are preferably all disposed in succession.

It is preferable that, in the projection lens of the present invention, a first lens group which has a negative refractive power and is different from the correction group is disposed on the most magnification side and the lens groups constituting the correction group are adjacently disposed on the reduction side of the first lens group.

If the projection lens of the present invention includes the first lens group described above, the projection lens preferably satisfies a conditional expression (2) given below and more preferably satisfies a conditional expression (2') given below:

$$-3.00 < fG1/f < -0.50 \tag{2}$$

$$-2.00 < fG1/f < -0.90 \tag{2'}$$

where fG1 is the focal length of the first lens group and f is the focal length of the entire system, in which f is the focal length of the entire system at the wide angle end, if the projection lens is variable in magnification, while if the projection lens is focusable, f is the focal length of the entire system under the state in which the magnification side conjugate position is at infinity.

If the projection lens of the present invention includes the first lens group described above, it is preferable that focusing is performed by moving the first lens group in an optical axis direction.

If the projection lens of the present invention is variable in magnification or focusable by moving at least some of the lens groups, the correction group is preferably fixed during either magnification change or focusing.

If the projection lens of the present invention is variable in magnification or focusable by moving at least some of the lens groups, the most reduction side lens group is preferably fixed during either magnification change or focusing.

The projection lens of the present invention preferably satisfies a conditional expression (3) given below and more preferably satisfies a conditional expression (3') given below:

$$0.70 < y/f \tag{3}$$

$$0.75 < y/f \tag{3'}$$

where y is the maximum image height when the reduction side is taken as the image side and f is the focal length of the entire system, in which f is the focal length of the entire system at the wide angle end, if the projection lens is variable in magnification, while if the projection lens is focusable, f is the focal length of the entire system under the state in which the magnification side conjugate position is at infinity.

Preferably, the projection lens of the present invention is a zoom lens.

A projection display apparatus according to the present invention includes a light source, a light valve that receives light from the light source, and the projection lens of the present invention, as a projection lens that projects an optical image formed by light optically modulated by the light valve onto a screen.

The term "magnification side" as used herein refers to the projected side (screen side) and the screen side is referred to as the magnification side even when reduced size projection is performed for convenience. In the mean time, the term "reduction side" as used herein refers to the original image display area side (light valve side) and the light valve side is referred to as the reduction side even when reduced size projection is performed for convenience.

The term "lens group" as used herein is not necessarily limited to those composed of a plurality of lenses and may include those composed of only one lens.

The signs of the aforementioned conditional expressions and refractive powers are determined in the paraxial region for those having an aspherical surface.

The foregoing description "if the projection lens is variable in magnification or focusable by moving at least some of the lens groups, the movement of the correction group for correcting field curvature is allowed to be performed independently of the movement for either changing magnification or focusing" as used herein refers to that "if the projection lens is variable in magnification by moving at least some of the lens groups, the movement of the correction group for correcting field curvature is allowed to be performed independently of the movement for changing magnification, and if the projection lens is focusable by moving at least some of the lens groups, the movement of the correction group for correcting field curvature is allowed to be performed independently of the movement for focusing", and if the projection lens is variable in magnification and focusable by moving at least some of the lens groups, the movement of the correction group for correcting field curvature is allowed to be performed independently of the movements for both changing magnification and focusing. If the projection lens is variable in magnification and focusable by moving at least some of the lens groups, the correction group is preferably fixed during both magnification change and focusing. If the projection lens is variable in magnification and focusable by moving at least some of the lens groups, the most reduction side lens group is preferably fixed during both magnification change and focusing.

According to the present invention, both correction of field curvature when the projection distance is changed and inhibition of variation in the field curvature when fastening error is absorbed are allowed to be performed independently of magnification change operation and focusing operation. Thus, a projection lens without any practical defocusing after correction of field curvature and a projection display apparatus equipped with the projection lens may be provided.

BRIEF DESCRIPTION OF THE DRAWINGS

FIG. 4 is a cross-sectional view of a projection lens of Example 1 of the present invention, illustrating the configuration thereof and ray trajectories, in which the upper and the lower sides illustrate cross-sectional views thereof when the projection distances are infinity and 480 respectively.

FIG. 5 is a cross-sectional view of a projection lens of Example 1 of the present invention, illustrating the configuration thereof and ray trajectories, in which the upper and the lower sides illustrate cross-sectional views thereof at the wide angle end and the telephoto end respectively.

FIG. 6 is a cross-sectional view of a projection lens of Example 2 of the present invention, illustrating the configuration thereof and ray trajectories, in which the upper and the lower sides illustrate cross-sectional views thereof when the projection distances are infinity and 480 respectively.

FIG. 7 is a cross-sectional view of a projection lens of Example 2 of the present invention, illustrating the configuration thereof and ray trajectories, in which the upper and the lower sides illustrate cross-sectional views thereof at the wide angle end and the telephoto end respectively.

FIG. 8 is a cross-sectional view of a projection lens of Example 3 of the present invention, illustrating the configuration thereof and ray trajectories, in which the upper and the lower sides illustrate cross-sectional views thereof when the projection distances are infinity and 480 respectively.

FIG. 9 is a cross-sectional view of a projection lens of Example 3 of the present invention, illustrating the configuration thereof and ray trajectories, in which the upper and the lower sides illustrate cross-sectional views thereof at the wide angle end and the telephoto end respectively.

FIG. 10 is a cross-sectional view of a projection lens of Example 4 of the present invention, illustrating the configuration thereof and ray trajectories, in which the upper and the lower sides illustrate cross-sectional views thereof when the projection distances are infinity and 480 respectively.

FIG. 11 is a cross-sectional view of a projection lens of Example 4 of the present invention, illustrating the configuration thereof and ray trajectories, in which the upper and the lower sides illustrate cross-sectional views thereof at the wide angle end and the telephoto end respectively.

FIG. 12 is a cross-sectional view of a projection lens of Example 5 of the present invention, illustrating the configuration thereof and ray trajectories, in which the upper and the lower sides illustrate cross-sectional views thereof when the projection distances are infinity and 480 respectively.

FIG. 13 is a cross-sectional view of a projection lens of Example 5 of the present invention, illustrating the configuration thereof and ray trajectories, in which the upper and the lower sides illustrate cross-sectional views thereof at the wide angle end and the telephoto end respectively.

FIG. 14 is a cross-sectional view of a projection lens of Example 6 of the present invention, illustrating the configuration thereof and ray trajectories, in which the upper and the lower sides illustrate cross-sectional views thereof when the projection distances are infinity and 480 respectively.

FIG. 15 is a cross-sectional view of a projection lens of Example 6 of the present invention, illustrating the configuration thereof and ray trajectories, in which the upper and the lower sides illustrate cross-sectional views thereof at the wide angle end and the telephoto end respectively FIG. 16 shows aberration diagrams of the projection lens according to Example 1 of the present invention at the wide angle end and the telephoto end when the projection distance is infinity.

FIG. 17 shows aberration diagrams of the projection lens according to Example 1 of the present invention at the wide angle end and the telephoto end when the projection distance is 1300.

FIG. 18 shows aberration diagrams of the projection lens according to Example 1 of the present invention at the wide angle end and the telephoto end when the projection distance is 480.

FIG. 19 shows aberration diagrams of the projection lens according to Example 2 of the present invention at the wide angle end and the telephoto end when the projection distance is infinity.

FIG. 20 shows aberration diagrams of the projection lens according to Example 2 of the present invention at the wide angle end and the telephoto end when the projection distance is 1300.

FIG. 21 shows aberration diagrams of the projection lens according to Example 2 of the present invention at the wide angle end and the telephoto end when the projection distance is 480.

FIG. 22 shows aberration diagrams of the projection lens according to Example 3 of the present invention at the wide angle end and the telephoto end when the projection distance is infinity.

FIG. 23 shows aberration diagrams of the projection lens according to Example 3 of the present invention at the wide angle end and the telephoto end when the projection distance is 1300.

FIG. 24 shows aberration diagrams of the projection lens according to Example 3 of the present invention at the wide angle end and the telephoto end when the projection distance is 480.

FIG. 25 shows aberration diagrams of the projection lens according to Example 4 of the present invention at the wide angle end and the telephoto end when the projection distance is infinity.

FIG. 26 shows aberration diagrams of the projection lens according to Example 4 of the present invention at the wide angle end and the telep4hoto end when the projection distance is 1300.

FIG. 27 shows aberration diagrams of the projection lens according to Example 4 of the present invention at the wide angle end and the telephoto end when the projection distance is 480.

FIG. 28 shows aberration diagrams of the projection lens according to Example 5 of the present invention at the wide angle end and the telephoto end when the projection distance is infinity.

FIG. 29 shows aberration diagrams of the projection lens according to Example 5 of the present invention at the wide angle end and the telep4hoto end when the projection distance is 1300.

FIG. 30 shows aberration diagrams of the projection lens according to Example 5 of the present invention at the wide angle end and the telephoto end when the projection distance is 480.

FIG. 31 shows aberration diagrams of the projection lens according to Example 6 of the present invention at the wide angle end and the telephoto end when the projection distance is infinity.

FIG. 32 shows aberration diagrams of the projection lens according to Example 6 of the present invention at the wide angle end and the telep4hoto end when the projection distance is 1300.

FIG. 33 shows aberration diagrams of the projection lens according to Example 6 of the present invention at the wide angle end and the telephoto end when the projection distance is 480.

DESCRIPTION OF THE PREFERRED EMBODIMENTS

Figure 1:
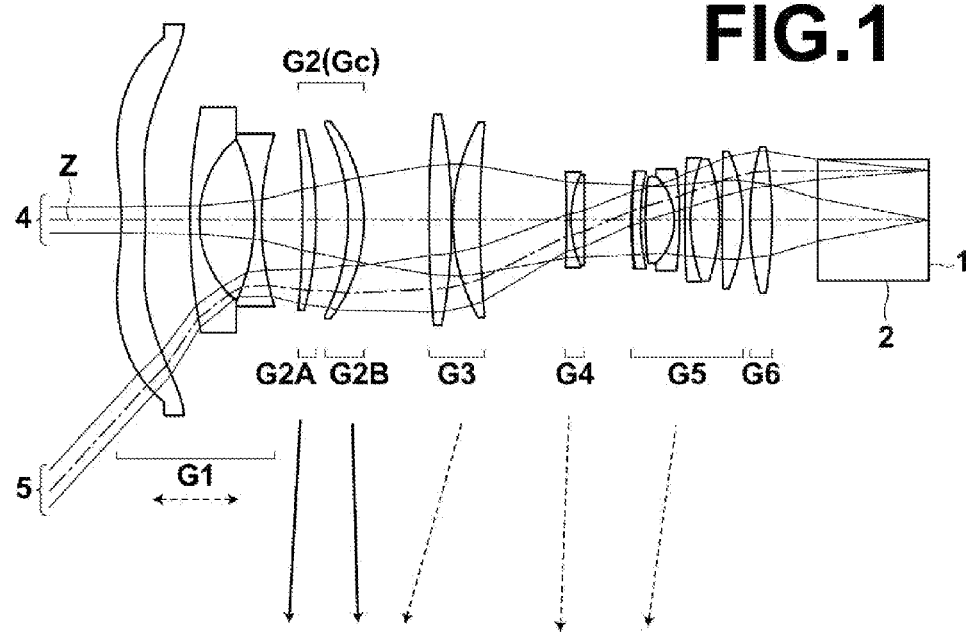
FIG. 1 is a cross-sectional view of a projection lens according to an embodiment of the present invention, illustrating the configuration thereof and ray trajectories.

Hereinafter, embodiments of the present invention will be described in detail with reference to the accompanying drawings. FIG. 1 is a cross-sectional view of a projection lens according to an embodiment of the present invention. The example illustrated in FIG. 1 corresponds to the projection lens of Example 1 to be described later. Note that an axial light beam 4 and a maximum image height light beam 5 are also illustrated in FIG. 1.

The example projection lens illustrated in FIG. 1 has a positive refractive power as a whole, and can be used as a projection lens mounted, for example, in a projection display apparatus to project image information displayed on a light valve onto a screen. In FIG. 1, the left side is assumed to be the magnification side and the right side is assumed to be the reduction side. FIG. 1 also illustrates a glass block 2 which assumes a filter, a prism, or the like used in a color combining section or an illumination light separating section, and an image display surface 1 of the light valve located on the reduction side surface of the glass block 2 on the assumption that the projection lens is to be mounted on a projection display apparatus.

In the projection display apparatus, light beams having image information given at the image display surface 1 are inputted to the projection lens through the glass block 2 and projected onto a screen (not shown) disposed on the left side of the drawing by the projection lens.

FIG. 1 illustrates an example in which the position of the reduction side surface of the glass block 2 corresponds to the position of the image display surface 1, but not limited to this. FIG. 1 illustrates only one image display surface 1 but the projection display apparatus may be configured so as to be able to display a full color image by separating a light beam from the light source into the three primary colors by a color separation optical system and disposing three light valves for the respective colors.

The example projection lens illustrated in FIG. 1 is composed of a first lens group G1, a second lens group G2, a third lens group G3, a fourth lens group G4, a fifth lens group G5, and a sixth lens group G6 disposed in order from the magnification side. The second lens group G2 is composed of two lens groups, a second A lens group G2A and a second B lens group G2B, adjacently disposed in order from the magnification side.

The example projection lens illustrated in FIG. 1 employs a focusing method in which focusing is performed by moving the first lens group G1 in optical axis directions and a horizontal dotted arrow is shown under the first lens group G1 to indicate that the lens group is moved when focusing. Further, the example projection lens illustrated in FIG. 1 employs a magnification changing method in which magnification is changed by moving the third lens group G3, the fourth lens group G4, and the fifth lens group G5 in an optical axis direction such that the distance between each lens group is changed and a dotted arrow is shown under each of the third lens group G3, the fourth lens group G4, and the fifth lens group G5 to schematically indicate a movement trajectory of each lens group when changing magnification from the wide angle end to the telephoto end.

Note that, however, the projection lens of the present invention may employ a focusing method which is different from that of the example illustrated in FIG. 1 and a configuration may be adopted in which the entire lens system or a lens system different from the first lend group G1 is moved when focusing. Further, the projection lens of the present invention may employ a magnification changing method which is different from that of the example illustrated in FIG. 1. Still further, the projection lens of the present invention may adopt a configuration that does not have a magnification changing function.

The projection lens of the present invention has a function to correct field curvature and includes a correction group Gc composed of a plurality of lens groups that corrects field curvature by moving in an optical axis direction and changing the distance between each lens group. This allows field curvature to be corrected when the projection distance is changed and variation in the field curvature to be inhibited when fastening error is absorbed by a function of the projection lens.

In the example illustrated in FIG. 1, field curvature may be corrected by changing the distance between the second A lens group G2A and the second B lens group G2B, and the second lens group G2 composed of these two lens groups corresponds to the correction group Gc. As an example, FIG. 1 illustrates a solid arrow under each of the second A lens group G2A and the second B lens group G2B, indicating a schematic trajectory of movement of each lens for correcting field curvature when the projection distance is changed from infinity to proximity at the wide angle end.

Note that the number of lens groups constituting the correction group is not limited to two and the correction group may be composed of three or more lens groups, but if two lens groups are used, the structure may be simplified while obtaining an effect of correcting field curvature with the minimum number of lens groups. Further, the lens groups constituting the correction group Gc are preferably disposed in succession as in the example illustrated in FIG. 1 for structural simplicity. But, all of the lens groups are not necessarily disposed in succession and a configuration may also be possible in which a lens group not constituting the correction group Gc is disposed between a plurality of lens groups constituting the correction group Gc.

If the projection lens is variable in magnification or focusable by moving at least some of the lens groups, the projection lens is configured such that the movement of the correction group Gc for correcting field curvature is allowed to be performed independently of the movement for changing magnification or focusing. This allows field curvature to be corrected when the magnification state or the focusing state is changed without being affected by these, while the magnification state or the focusing state is not affected by the correction of field curvature by the correction group Gc. That is, it is possible to separate the magnification changing mechanism from the field curvature correction mechanism and the focusing mechanism from the field curvature correction mechanism.

The term "the movement for correcting field curvature is independent of the movement for changing magnification" as used herein refers to that each movement is performed independently of the other, and it is possible that one of the movements does not cause the movement of the other. The same applies to the term "the movement for correcting field curvature is independent of the movement for focusing".

Note that the term "independent" as used herein refers to independent with respect to the movement and lens groups are not necessarily independent. A lens group constituting the correction group Gc and a lens group moved when changing magnification may be partly or entirely overlapped, and a lens group constituting the correction group Gc and a lens group moved when focusing may be partly or entirely overlapped. For example, the correction group Gc may constitute a part of the lens groups moved when focusing as in an example to be described later.

But, if the projection lens is variable in magnification or focusable by moving at least some of the lens groups, it is preferable that the projection lens is configured such that the correction lens group Gc is composed of lens groups which do not overlap with any of the lens groups moved when magnification is changed or any of those moved when focusing, as in the example illustrated in FIG. 1, and the correction lens group Gc is fixed during either magnification change or focusing, in order to simplify the structure.

The movement of the correction group Gc for correcting field curvature is made such that the conjugate length of a combined optical system combining the most magnification side lens group constituting the correction group Gc to the most reduction side lens group constituting the correction group Gc in the projection lens is constant before and after the movement of the correction group Gc for correcting field curvature. The combined optical systems which will be described herein below are all defined here.

In the example illustrated in FIG. 1, the combined optical system is the second lens group G2. More specifically, in the example illustrated in FIG. 1, the movement of the second A lens group G2A and the second B lens group G2B are made such that the conjugate length of a combined optical system combining the second A lens group G2A and the second B lens group G2B (i.e., the second lens group G2) in the projection lens is constant before and after the movement.

Figure 2:
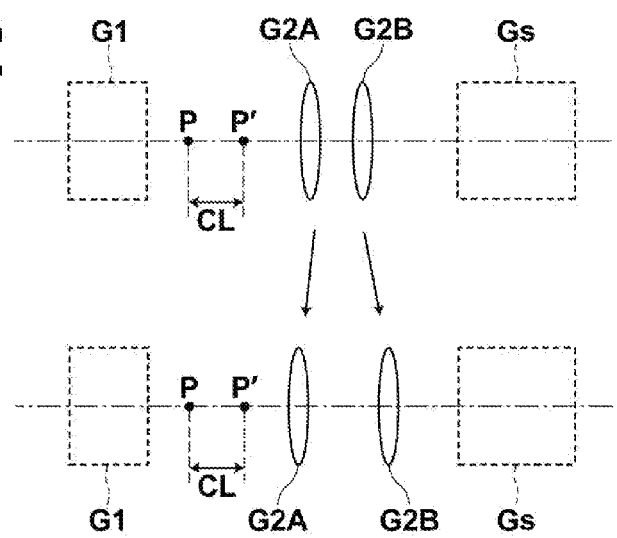
FIG. 2 is a drawing for explaining that the conjugate length of the second lens groups is constant before and after the correction of field curvature.

FIG. 2 schematically illustrates the states before and after the movement for correcting field curvature on the upper and lower side respectively. FIG. 2 is a conceptual diagram of the projection lens illustrated in FIG. 1, and from the third lens group G3 to the sixth lens group G6 are collectively illustrated as a subsequent lens group Gs. The points P and P' shown in FIG. 2 are those at conjugate positions with each other in the projection lens with respect to the second lens group G2, which correspond to so-called the object point and the image point. The distance between the points P and P' is the conjugate length CL. As the conjugate length CL before the movement and the conjugate length CL after the movement are the same, the correction of field curvature by the use of the correction group Gc does not cause defocusing of the entire system and the focusing operation needs not be performed again after the correction of field curvature.

In a projection lens, unlike the example illustrated in FIG. 1, in which a lens group, an optical element, and the like, which do not constitute the correction group Gc are disposed between a plurality of lens groups constituting the correction group Gc, the combined optical system includes the lens group, optical element, and the like, which do not constitute the correction group Gc.

The term constant in the "conjugate length of a combined optical system - - - is constant" described above is not necessarily be absolutely constant and may be substantially constant. For example, when the conjugate length of the combined optical system is assumed to be changed by $\Delta CL$ for correcting field curvature generated when the projection distance is changed by $\Delta PL$ by the correction group Gc, if the amount of change $\Delta 1$ in the reduction side conjugate point generated by the change in the conjugate length is smaller than the amount of change $\Delta 2$ in the reduction side conjugate point generated due to the change in the projection distance by $\Delta PL$, there will be no problem and such amount of $\Delta CL$ may be regarded as constant. The amount of $\Delta CL$ is preferably a value that makes $\Delta 1$ less than or equal to $\frac{1}{10}$ of $\Delta 2$. That is, it is the amount that causes hardly any defocusing or the amount that allows refocusing through a small correction.

If the magnification ratio of the combined optical system combining from the most magnification side lens group constituting the correction group Gc and to the most reduction side lens group constituting the correction group Gc in the projection lens is taken as $\beta$, the projection lens preferably satisfies a conditional expression (1) given below. If the projection lens is focusable, the conditional expression (1) is under the state in which the magnification side conjugate position is at infinity.

$$0.50 < \beta < 3.00 \quad (1)$$

Configuration of the projection lens so as not to fall below the lower limit of the conditional expression (1) allows the lens diameter of the magnification side lens group of the correction group Gc to be prevented from increasing, which is advantageous for downsizing. Configuration of the projection lens so as not to exceed the upper limit of the conditional expression (1) allows variation in the aberration due to the movement of the correction group Gc to be prevented. By satisfying the conditional expression (1), the lens system may be prevented from increasing in size and may act favorably as the correction group Gc.

In order to further enhance the advantageous effect with respect to the conditional expression (1) described above, the projection lens more preferably satisfies a conditional expression (1') given below, and further preferably satisfies a conditional expression (1'') given below:

$$0.50 < \beta < 2.50 \quad (1')$$

$$0.70 < \beta < 2.00 \quad (1'')$$

In order to prevent the focal length of the entire system from changing largely due to correction of field curvature by the correction group Gc, the change in the β described above is preferably ±3% within the moving range of the lens groups constituting the correction group Gc.

In the projection lens of the present embodiment, the first lens group G1 disposed on the most magnification side preferably has a negative refractive power and is different from the correction group Gc, and the lens groups constituting the correction group are adjacently disposed on the reduction side of the first lens group. The use of a negative lens group as the most magnification side lens group is advantageous for angle increase. As described under SUMMARY OF THE INVENTION, the variation in the field curvature due to the change in the projection distance and the problem of fastening error are particularly significant in wide angle lens systems, it is effective to apply the present invention to wide angle lenses. Further, the disposition of the lens groups constituting the correction group Gc immediately following the reduction side of the first lens group G1 makes it easy to control light beams entering the first lens group G1 and the correction of field curvature becomes easy. In order to make the projection lens as a wide angle lens system, a relatively strong negative refractive power needs to be given to the most magnification side negative lens group, but if the lens distance in the most magnification side negative lens is changed for the correction of field curvature, distortion will be varied largely with field curvature variation, which is undesirable. Therefore, it is preferable that the first lens group G1 is a lens group that does not constitute the correction group Gc.

It is preferable that the focusing is performed by moving only the first lens group G1, which does not constitute the correction group Gc and is disposed on the most magnification side, in an optical axis direction, as in the example illustrated in FIG. 1. In doing so, the structure may be simplified and it is easy to obtain a large amount of adjustment of the reduction side conjugate position by a small amount of movement of the first lens group G1.

Preferably, the projection lens satisfies a conditional expression (2) given below if the focal length of the first lens group G1 is taken as fG1 and the focal length of the entire system is taken as f. Note that, f is the focal length at the wide angle end, if the projection lens variable in magnification, while f is the focal length when the magnification side conjugate position is at infinity, if the projection lens is focusable.

$$-3.00 < fG1/f < -0.50 \quad (2)$$

Configuration of the projection lens so as not to fall below the lower limit of the conditional expression (2) allows the lens diameter of the first lens group G1 to be prevented from increasing and it is easy to secure a back focus of appropriate length. Configuration of the projection lens so as not to exceed the upper limit of the conditional expression (2) allows ease of satisfactory correction of field curvature. By satisfying the conditional expression (2), it is possible to secure a back focus of appropriate length, inhibit increase in lens diameter, and correct field curvature satisfactorily.

In order to further enhance the advantageous effect with respect to the conditional expression (2) described above, the projection lens more preferably satisfies a conditional expression (2') given below:

$$-2.00 < fG1/f < -0.90 \quad (2')$$

In the projection lens of the present embodiment, if the projection lens is variable in magnification or focusable by moving at least some of the lens groups, the most reduction side lens group is preferably fixed during magnification change or focusing. In the example illustrated in FIG. 1, the sixth lens group G6 is fixed during both magnification change and focusing. The configuration in which the most reduction side lens group is fixed during both magnification change and focusing is advantageous for facilitating taking a telecentric configuration on the reduction side and preventing change in the F-number during magnification change.

Preferably, the projection lens of the present embodiment satisfies a conditional expression (3) given below if the maximum image height is taken as y when the reduction side is taken as the image side and the focal length of the entire system is taken as f. Note that, f is the focal length at the wide angle end, if the projection lens is variable in magnification, while f is the focal length under the state in which the magnification side conjugate position is at infinity, if the projection lens is focusable. By satisfying the conditional expression (3), a wide angle of view is secured and the projection lens can be a wide angle lens system.

$$0.70 < y/f \quad (3)$$

In order to further enhance the advantageous effect with respect to the conditional expression (3) described above, the projection lens more preferably satisfies a conditional expression (3') given below:

$$0.75 < y/f \quad (3')$$

Note that each conditional expression described above is under the state in which field curvature is corrected satisfactorily. Further, as image projection is generally performed onto flat screens, all of the conditional expressions described above are under the state in which field curvature is corrected satisfactorily with respect to a flat surface located at the conjugate position and perpendicular to the optical axis.

The projection lens of the present invention is applicable to both the single focus optical systems and variable magnification optical systems, and in the case of the variable magnification optical system, the projection lens is applicable to both the varifocal lenses and zoom lenses. If the projection lens of the present invention is made into a zoom lens, as in the example illustrated in FIG. 1, the projection lens may have a high versatility.

As the overall length of the entire system becomes long if the amount of movement of the correction group Gc is increased, it is preferable that, in the case of a zoom lens, it does not require the field curvature correction mechanism at the time of changing magnification, that is, satisfactory correction of field curvature is realized before and after the magnification changing operation if only the magnification changing operation is performed without changing the projection distance. It is possible, however, that the correction group Gc of the present invention may be used to perform fine adjustment of field curvature variation that occurs due to a manufacturing error or the like at the time of changing magnification. If such is the case, it is an effective means. As it is unthinkable, in normal use of a projection display device, to use the magnification changing mechanism many times while performing projection, a configuration may be adopted in which the correction group Gc is driven to correct field curvature each time magnification changing operation is performed in order to obtain a good projected image.

In order to introduce illumination light into the projection lens with minimal loss of illumination light, it is preferable that the angle formed between the angle bisector line of the outermost ray on the upper side and the outermost ray on the lower side of each light beam and the principal ray of each light beam is within ±3° in a cross-section of light beam focused on an arbitrary point on the reduction side image plane.

In order to satisfy appropriate specs as a projection lens intended in the present invention, the distortion is preferably limited to within about ±2%, and if the projection lens is a variable magnification optical system, the distortion is preferably limited to within about ±2% in the entire variable range of magnification.

In the example illustrated in FIG. 1, each of the second A lens group G2A and the second B lens group G2B is composed of one positive meniscus lens, but the number of lenses of each lens group constituting the correction group Gc is not limited to this and each lens group constituting the correction group Gc may have a plurality of lenses. If each of the lens groups constituting the correction group Gc is composed of one lens, however, the load of the drive mechanism may be reduced and may contribute to the simplification of the apparatus. Further, the sign of the refractive power of each lens group constituting the correction group Gc is not limited to positive and positive, and a combination of positive and negative and a combination of negative and negative are also possible. Still further, the lens shape constituting the correction group Gc is not necessarily limited to meniscus shape, but the meniscus shape is advantageous for satisfactory correction of field curvature and inhibition of variation in the focal length of the entire system when field curvature is corrected by the correction group Gc.

The preferable configurations and possible configurations described above may be combined arbitrarily and it is preferable that they are selectively employed as appropriate according to the requirements of the projection lens.

Figure 3:
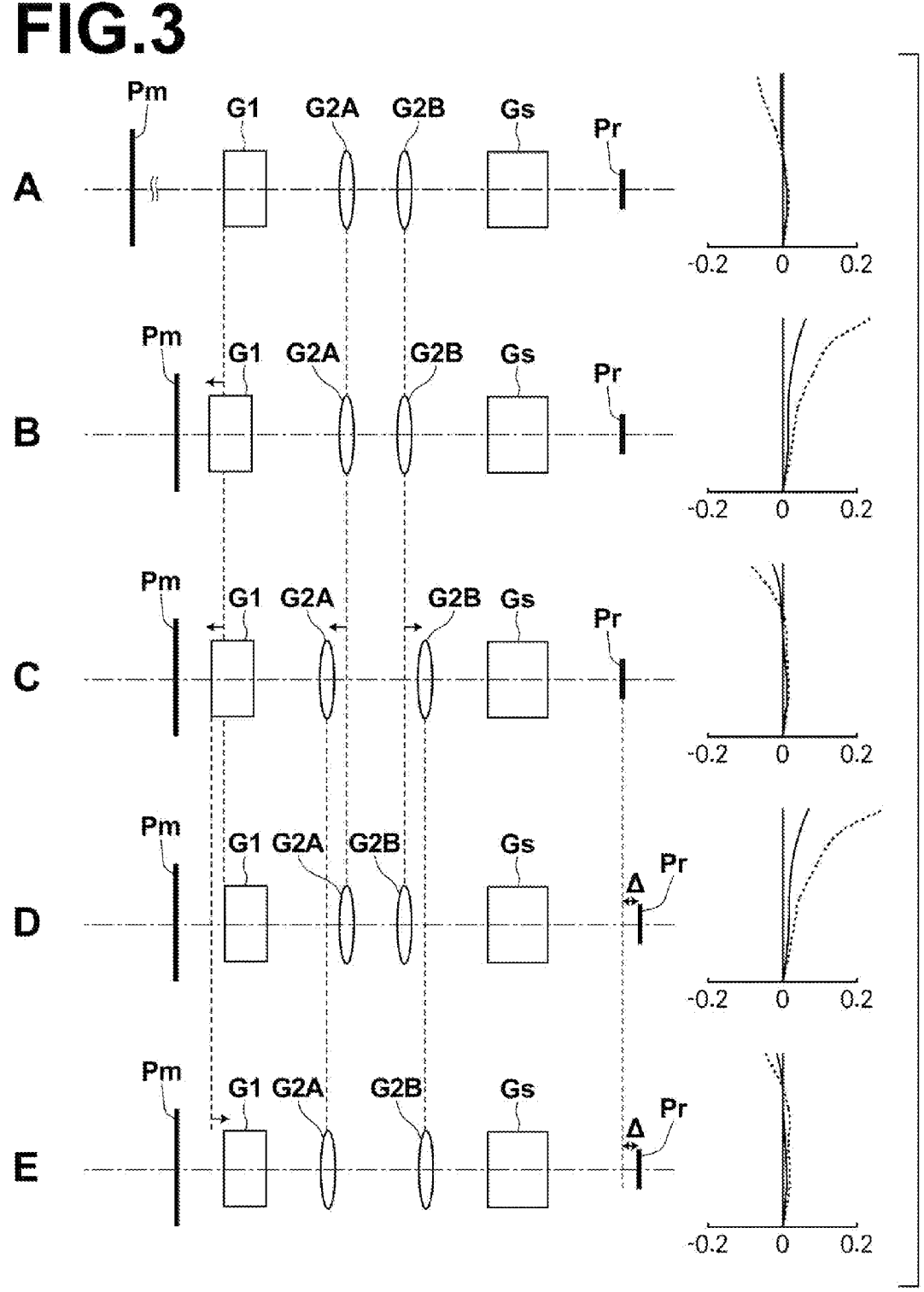
FIG. 3 is a drawing for explaining focusing operations or correction operations of field curvature and field curvature after each operation.

Movement of the focusing group or the correction group Gc, and changes in the field curvature due to the movement will now be described with reference to FIG. 3. FIG. 3 conceptually illustrates constituent elements of the projection lens illustrated in FIG. 1, and from the third lens group G3 to the sixth lens group G6 are collectively illustrated as a subsequent lens group Gs. The first lens group G1 in FIG. 3 corresponds to the focus lens group, and the second A lens group G2A and the second B lens group G2B are lens groups constituting the correction group Gc.

The positions of magnification side conjugate plane Pm, first lens group G1, second A lens group G2A and the second B lens group G2B constituting the correction group Gc, and the reduction side conjugate plane Pr are schematically illustrated on the left side of FIG. 3 and an aberration diagram representing field curvature at the reduction side conjugate plane Pr is shown on the right side in association with the state shown on the left side. The vertical axis of the aberration diagram is half angle of view while the horizontal axis is the amount of aberration, in which aberrations in the sagittal direction and tangential direction are indicated by the solid line and the dotted line respectively. Note that the numerical data corresponding to A to E of FIG. 3 are shown in Table 4 under the description of Example 1 to be described later.

The operation and change in the field curvature when the projection distance is changed will be described first. A of FIG. 3 is under the state in which the projection distance (distance from the first lens group G1 to the magnification side conjugate plane Pm) is infinity. That is, the projection lens is under the state in which the lens is in focus on the magnification side conjugate plane Pm at infinity and field curvature is well corrected.

B of FIG. 3 shows the state in which the projection distance has been changed to proximity of 480 from the state shown in A of FIG. 3 and focusing has been performed such that the position of the reduction side conjugate plane Pr corresponds to the position of the reduction side conjugate plane Pr shown in A of FIG. 3 using only the first lens group G1. The field curvature under this state has varied largely in comparison with that shown in A of FIG. 3 and the image plane is curved largely.

C of FIG. 3 shows the state in which the field curvature has been corrected by moving the second A lens group G2A and the second B lens group G2B from the state shown in B of FIG. 3 based on the philosophy described above. As the second A lens group G2A and the second B lens group G2B have been moved such that the conjugate length of the combined optical system combining the second A lens group G2A and the second B lens group G2B is constant before and after the correction of field curvature, the position of the reduction side conjugate plane Pr shown in C of FIG. 3 corresponds to the position of the reduction side conjugate plane Pr shown in A of FIG. 3. The field curvature under this state is small, showing that the field curvature is well corrected.

The operation procedure when a projection display apparatus having the projection lens mounted thereon is actually used is as follows. First, the focusing mechanism is driven such that an in-plane image near the optical axis of the magnification side conjugate plane Pm is brought into focus and then the second A lens group G2A and the second B lens group G2B are moved such that an in-plane image on the periphery of the magnification side conjugate plane Pm is brought into focus.

Now, the advantage that the movement of the correction group Gc for performing correction is allowed to be performed independently of the movement of the focusing group which is the characteristic of the projection lens of the present embodiment will be described hereinafter with reference to FIG. 3. Floating focusing is known as a means for correcting variation in the field curvature of a wide angle lens when the projection distance is changed. The projection lens of the present embodiment may be regarded as one type of floating focusing if modified such that the focusing group and the correction group Gc are associated with each other and moved simultaneously in different movement trajectories.

D of FIG. 3 shows the state in which the projection distance has been changed to proximity of 480 from the state shown in A of FIG. 3 and any of the first lens group G1, the second A lens group G2A and the second B lens group G2B, and the subsequent group Gs has not been moved. The position of the reduction side conjugate plane Pr shown in D of FIG. 3 is shifted by A in comparison with that shown in A of FIG. 3. The field curvature shown in D of FIG. 3 has varied largely in comparison with that shown in A of FIG. 3 and the image plane is curved largely. Here, A can be regarded as a fastening error and the following discussion may be made.

Comparison between C of FIG. 3 and D of FIG. 3 shows that the state shown in D of FIG. 3 can be regarded as the state in which a fastening error Δ0 occurred from the state shown in C of FIG. 3 and the first lens group G1, the second A lens group G2A, and the second B lens group G2B have been moved such that the projection distance is 480 which corresponds to that shown in C of FIG. 3 in order to absorb the fastening error. As described above, the image plane shown in D of FIG. 3 is curved largely.

In the mean time, the state shown in E of FIG. 3 can be regarded as the state in which a fastening error Δ occurred from the state shown in C of FIG. 3 and only the first lens group G1 has been moved such that the projection distance becomes 480 which corresponds to that shown in C of FIG. 3 in order to absorb the fastening error. The field curvature under this state is small, showing that the field curvature is well corrected.

The description above shows that it is difficult, in a wide angle lens, to correct both the variation in the field curvature when the projection distance is changed and the variation in the field curvature due to a fastening error by moving only the focusing lens. Therefore, in order to correct both variations described above, it is effective to allow the focusing group for adjusting focus and the correction group Gc for correcting field curvature to be moved independently, as in the present embodiment.

In a common conventional floating focusing, the focusing group and the aberration correction lens group which is moved in a movement trajectory different from that of the focusing group are associated and moved simultaneously. Consequently, even if a focusing group of a common conventional floating focusing mechanism is simply separated and the aberration correction lens group is tried to assume the function of the correction group Gc of the present embodiment, the focusing operation in practical use becomes very complicated since the point of focus is also moved with the movement of the aberration correction lens group and it is impossible to obtain an advantageous effect identical to that of the projection lens of the present embodiment. In order to prevent variation in the point of focus after correction of field curvature, the conjugate length of the combined optical system needs to be constant before and after the movement, as in the projection lens of the present embodiment.

Specific examples of the projection lens of the present invention will now be described. Among Examples 1 to 6, to be described hereinafter, Examples 1, 2, and 4 to 6 are configured telecentric on the reduction side while Example 3 is configured non-telecentric on the reduction side. Examples 1 to 6 are all zoom lenses and are of configurations in which there is almost no variation in the field curvature before and after the magnification changing operation and field curvature correction is not required when magnification changing operation is performed.

Example 1

FIGS. 4 and 5 illustrate cross-sectional views of the projection lens of Example 1 with ray trajectories. FIG. 4 illustrates the dispositions and configurations of each lens group at the wide angle end with projection distances being infinity and 480 on the upper and lower sides respectively. FIG. 5 illustrates the dispositions and configurations of each lens group at the wide angle end and the telephoto end with the projection distance being infinity on the upper and lower sides respectively. In FIGS. 4 and 5, the left side of the drawings is assumed to be the magnification side and the right side is assumed to be the reduction side. FIGS. 4 and 5 also illustrate an axial light beam 4, a maximum image height light beam 5, a glass block 2 which assumes a filter, a prism, or the like, and an image display surface 1 of the light valve located on the reduction side surface of the glass block 2.

The schematic configuration of the projection lens of Example 1 is as follows. The projection lens of Example 1 is composed of 16 lenses of lenses L1 to L16 disposed in order from the magnification side and is a zoom lens in which six lens groups of a first lens group G1 to a sixth lens group G6 are disposed in order from the magnification side. The first lens group G1 has a negative refractive power. The second lens group G2 corresponds to the correction group Gc and is composed of two lens groups of a second A lens group G2A constituted by the lens L4 and a second B lens group G2B constituted by the lens L5 disposed in order from the magnification side. Each of the lenses L4 and L5 is a positive meniscus lens with a convex surface on the reduction side.

When changing magnification, three lens groups of the third lens group G3 to the fifth lens group G5 are moved in an optical axis direction while changing the distance between each of them. When focusing, the first lens group G1 is moved in an optical axis direction. A schematic movement direction of each of the second A lens group G2A and the second B lens group G2B when the projection distance is changed from infinity to 480 is illustrated by a solid arrow between the upper and lower sides of FIG. 4. A schematic movement direction of each of the third lens group G3 to the fifth lens group 5 at the time of changing magnification from the wide angle end to the telephoto end when the projection distance is infinity is indicated by a dotted arrow between the upper and lower sides of FIG. 5. A dotted double arrow is shown under the first lens group G1 on the lower side of each of FIGS. 4 and 5, indicating that the first lend group G1 is moved at the time of focusing. Note that the reference symbol of each lens is omitted in FIG. 5.

Numerical data indicating the detailed configuration of the projection lens of Example 1 are shown in Tables 1 to 3 herein below. Table 1 shows basic lens data, Table 2 shows aspherical surface coefficients, and Table 3 shows specs with respect to the d-line and values of variable surface distances. The numerical values in Tables 1 to 3 are those normalized such that the focal length of the entire system at the wide angle end with the projection distance being infinity becomes 10 and rounded to a predetermined digit.

The Si column in Table 1 indicates $i^{th}$ surface number in which a number i (i=1, 2, 3, - - - ) is given to each surface in a serially increasing manner toward the reduction side with the magnification side surface of the most magnification side component being taken as the first surface. The Ri column indicates the radius of curvature of $i^{th}$ surface and the Di column indicates the surface distance between $i^{th}$ surface and $(i+1)^{th}$ surface on the optical axis Z. The Ndj column indicates the refractive index of $j^{th}$ component with respect to the d-line (wavelength of 587.56 nm) in which a number j (j=1, 2, 3, - - - ) is given to each component in a serially increasing manner toward the reduction side with the most magnification side component being taken as the first component, and the vdj column indicates the Abbe number of $j^{th}$ component with respect to the d-line.

Note that the sign of the radius of curvature is positive if the surface shape is convex on the magnification side and negative if it is convex on the reduction side. The basic lens data include the glass block 2. An asterisk mark * is attached to the surface number of an aspherical surface and a value of paraxial radius of curvature is shown in the section of the radius of curvature column corresponding to the aspherical surface.

Table 2 shows aspherical surface coefficients of each aspherical surface of Example 1. The "E-n" (n: integer) in the values of aspherical surface coefficients in Table 2 refers to "×10$^{-n}$". The aspherical surface coefficients are the values of coefficients KA and Am (m is an integer of three or greater and differs depending on the aspherical surface) in an aspherical surface expression given below. The Σ in the expression given below means the sum of the term "m".

$$Zd = C \cdot h^2 / \{1 + (1 - KA \cdot C^2 \cdot h^2)^{1/2}\} + \Sigma Am \cdot h^m$$

where:
Zd: depth of aspheric surface (length of vertical line from a point on the aspheric surface at height h to a flat surface orthogonal to the optical axis to which the aspherical vertex contacts)
h: height (distance from the optical axis to lens surface);
C: paraxial curvature
KA, Am: aspherical surface coefficients The symbol DD[i] appearing in the Di column of Table 1 means that the distance between the $i^{th}$ surface and the $(i+1)^{th}$ surface is a variable surface distance. The symbols DD [6], DD [8], DD [10], DD [14], DD [17] and DD [28] correspond to the distance between the first lens group G1 and the second A lens group G2A, the distance between the second A lens group G2A and the second B lens group G2B, the distance between the second B lens group G2B and the third lens group G3, the distance between the third lens group G3 and the fourth lens group G4, the distance between the fourth lens group G4 and the fifth lens group G5, and the distance between the fifth lens group G5 and the sixth lens group G6 respectively.

Table 3 shows zoom ratio, focal length f of the entire system, F-number FNo., total angle of view 2ω (degree), and value of each variable surface distance when the magnification state is at the wide angle end and the telephoto end with the projection distance of infinity, 1300, and 480. The values shown in Table 3 are those with respect to the d-line. The projection distance is the distance from the most magnification side lens surface of the projection lens to the magnification side conjugate point (screen) on the optical axis. The conjugate length of the combined optical system described above (second lens group G2) is shown at the bottom outside the box of Table 3. The sign of the conjugate length is positive if the point P shown in FIG. 2 is located on the magnification side of the point P' and negative if it is located on the reduction side of the point P'. The conjugate length of the combined optical system of Example 1 is constant before and after the correction of field curvature by the correction group Gc.

TABLE 1

Example 1 Basic Lens Data

| Si | Ri | Di | Ndj | ν dj |
|---|---|---|---|---|
| *1 | −39.6177 | 5.2981 | 1.49100 | 57.58 |
| *2 | −66.4357 | 9.8015 | | |
| 3 | 109.1591 | 2.0436 | 1.63854 | 55.38 |
| 4 | 20.4168 | 12.0570 | | |
| 5 | −35.9534 | 1.5894 | 1.80100 | 34.97 |
| 6 | 53.8519 | DD[6] | | |
| 7 | −168.4445 | 2.9594 | 1.63854 | 55.38 |
| 8 | −64.5642 | DD[8] | | |
| 9 | −38.0856 | 3.4816 | 1.51633 | 64.14 |
| 10 | −30.4579 | DD[10] | | |
| 11 | 217.0744 | 5.0029 | 1.77250 | 49.60 |
| 12 | −101.0760 | 0.2271 | | |
| 13 | 37.2800 | 6.0020 | 1.74400 | 44.78 |
| 14 | 197.1748 | DD[14] | | |
| 15 | −227.7873 | 0.9915 | 1.77250 | 49.60 |
| 16 | 20.5151 | 3.0124 | 1.51633 | 64.14 |
| 17 | ∞ | DD[17] | | |
| *18 | 85.6933 | 0.3027 | 1.52516 | 53.74 |
| 19 | 85.6933 | 1.7408 | 1.58144 | 40.75 |
| 20 | 36.9182 | 1.1126 | | |
| 21 | 63.4716 | 6.3729 | 1.49700 | 81.54 |
| 22 | −11.3501 | 1.1353 | 1.83400 | 37.16 |
| 23 | −76.4976 | 1.1504 | | |
| 24 | 178.1314 | 1.2943 | 1.80400 | 46.58 |
| 25 | 33.3486 | 6.3199 | 1.48749 | 70.23 |
| 26 | −33.3486 | 0.5449 | | |
| 27 | 352.6566 | 4.6548 | 1.49700 | 81.54 |
| 28 | −31.6839 | DD[28] | | |
| 29 | 49.5782 | 4.8743 | 1.63854 | 55.38 |
| 30 | −77.3962 | 10.0450 | | |
| 31 | ∞ | 24.4470 | 1.51633 | 64.14 |
| 32 | ∞ | | | |

TABLE 2

Example 1 Aspherical Surface Coefficient

| Si | 1 | 2 | 18 |
|---|---|---|---|
| KA | 5.0260498E−03 | −1.0158003E+01 | 1.0000000E+00 |
| A3 | 1.6205349E−04 | 2.1317353E−04 | — |
| A4 | 5.0344494E−05 | 3.1066395E−05 | 1.9123071E−05 |
| A5 | −2.0200306E−06 | −1.0631587E−06 | — |
| A6 | 1.1806986E−08 | 1.9237340E−09 | 6.5199965E−08 |
| A7 | 9.5330638E−10 | 1.5638078E−10 | — |
| A8 | −1.4193559E−11 | −2.4445163E−12 | 9.2214689E−10 |
| A9 | −2.3169500E−13 | 1.4951022E−13 | — |
| A10 | 2.9141843E−15 | 9.1955347E−17 | 2.0039591E−12 |
| A11 | 9.5518919E−17 | −9.3236911E−17 | |
| A12 | −1.0955269E−18 | 7.1487544E−19 | |
| A13 | 6.7460798E−23 | −2.7372331E−22 | |
| A14 | −8.7008592E−24 | −2.9133372E−24 | |
| A15 | −1.2550364E−25 | 1.4236516E−24 | |

TABLE 3

Example 1 Specs and Variable Surface Distance

| Magnification Status | Wide Angle End | Telephoto End | Wide Angle End | Telephoto End | Wide Angle End | Telephoto End |
|---|---|---|---|---|---|---|
| Projection Distance | ∞ | ∞ | 1300 | 1300 | 480 | 480 |
| Zoom Ratio | 1.0 | 1.3 | 1.0 | 1.3 | 1.0 | 1.3 |
| f | 10.00 | 13.00 | 9.98 | 12.98 | 9.94 | 12.93 |
| FNo. | 1.90 | 2.10 | 1.90 | 2.10 | 1.90 | 2.10 |
| 2ω(°) | 89.6 | 75.2 | 89.6 | 75.2 | 89.8 | 75.4 |
| DD[6] | 9.0553 | 9.0553 | 8.4024 | 8.4024 | 7.2589 | 7.2589 |
| DD[8] | 7.0537 | 7.0537 | 8.7918 | 8.7918 | 11.7021 | 11.7021 |
| DD[10] | 14.3038 | 4.3023 | 13.3157 | 3.3143 | 11.7054 | 1.7040 |
| DD[14] | 19.0319 | 26.9289 | 19.0319 | 26.9289 | 19.0319 | 26.9289 |
| DD[17] | 10.2087 | 1.8907 | 10.2087 | 1.8907 | 10.2087 | 1.8907 |
| DD[28] | 1.5131 | 11.9356 | 1.5131 | 11.9356 | 1.5131 | 11.9356 |

Conjugate Length of Combined Optical System: −17.016

Table 4 shows various numerical values in each state of A to E of FIG. 3. The Pr position in Table 4 is the position of reduction side conjugate plane Pr. With the position when the projection distance is infinity at the wide angle end being taken as the reference position "0", the Pr position is positive if it is on the reduction side of the reference position and negative if it is on the magnification side of the reference position. The Δ described above corresponds to the value 0.1965 in Table 4.

TABLE 4

Example 1

|  | (A) | (B) | (C) | (D) | (E) |
|---|---|---|---|---|---|
| Magnification Status | Wide Angle End | Wide Angle End | Wide Angle End | Wide Angle End | Wide Angle End |
| Projection Distance | ∞ | 480 | 480 | 480 | 480 |
| f | 10.00 | 10.01 | 9.94 | 10.00 | 9.93 |
| FNo. | 1.90 | 1.90 | 1.90 | 1.90 | 1.90 |
| 2ω(°) | 89.6 | 89.4 | 89.8 | 89.6 | 90.0 |
| DD[6] | 9.0553 | 9.3089 | 7.2589 | 9.0553 | 7.0016 |
| DD[8] | 7.0537 | 7.0537 | 11.7021 | 7.0537 | 11.7021 |
| DD[10] | 14.3038 | 14.3038 | 11.7054 | 14.3038 | 11.7054 |
| Pr Position | 0.0000 | 0.0000 | 0.0000 | 0.1965 | 0.1965 |

Aberration diagrams of the projection lens of Example 1 are illustrated in A to H of FIG. 16, A to H of FIG. 17, and A to H of FIG. 18. As indicated on the upper left of FIG. 16, the aberration diagrams of A to D of FIG. 16 are at the wide angle end with the projection distance being infinity, and as indicated on the lower left of FIG. 16, the aberration diagrams of E to H of FIG. 16 are at the telephoto end with the projection distance being infinity. Likewise, the aberration diagrams of A to D of FIG. 17 are at the wide angle end with the projection distance being 1300 and the aberration diagrams of E to H of FIG. 17 are at the telephoto end with the projection distance being 1300, and the aberration diagrams of A to D of FIG. 18 are at the wide angle end with the projection distance being 480 and the aberration diagrams of E to H of FIG. 17 are at the telephoto end with the projection distance being 480.

In each of the diagrams of A to H of FIG. 16, the diagrams of A to H of FIG. 17, and the diagrams of A to H of FIG. 18, the diagrams A and E show spherical aberrations, the diagrams B and F show astigmatisms, the diagrams C and G show distortions, and the diagrams of D and H show lateral chromatic aberrations. Each aberration diagram is based on the d-line (587.56 nm). The spherical aberration diagrams also illustrate aberrations with respect to the F-line (wavelength of 486.1 nm) and the C-line (wavelength of 656.27 nm), and the lateral chromatic aberration diagrams illustrate aberrations with respect to the F-line and C-line. In the astigmatism diagrams, the solid line illustrates astigmatism in the sagittal direction while the dotted line illustrates astigmatism in the tangential direction, which are denoted by the symbols (S) and (T) appended to the line type descriptions. The "Fno." in the spherical aberration diagrams represents the F-number and the "ω" in the other aberration diagrams represents the half angle of view. Each of these aberration diagrams is normalized such that the focal length of the entire system at the wide angle end with the projection distance being infinity becomes 10.

The symbols and their meanings, and illustration method used in the description of Example 1, and the data are those normalized such that the focal length of the entire system at the wide angle end with the projection distance being infinity becomes 10 will apply to the following examples unless otherwise specifically described.

Example 2

FIGS. 6 and 7 illustrate cross-sectional views of the projection lens of Example 2 with ray trajectories. FIG. 6 illustrates the dispositions and configurations of each lens group at the wide angle end with projection distances being infinity and 480 on the upper and lower sides respectively. FIG. 7 illustrates the dispositions and configurations of each lens group at the wide angle end and the telephoto end with the projection distance being infinity on the upper and lower sides respectively. The schematic configuration of the projection lens of Example 2 is similar to that of Example 1 described above, except that the lens L4 is a biconvex lens and the lens L5 a negative meniscus lens with a convex surface on the magnification side. Further, the projection lens of Example 2 differs from that of Example 1 in that, whereas the lenses L4 and L5 in Example 1 are spherical lenses, the lens L5 in Example 2 is an aspherical lens. In the projection lens of Example 2, the aspherical surface of lens L5 operates effectively to correct field curvature. Tables 5, 6, and 7 respectively show basic lens data, aspherical surface coefficients, and specs with respect to the d-line and values of variable surface distances of the projection lens of Example 2. Aberration diagrams of the projection lens of Example 2 are illustrated in A to H of FIG. 19, A to H of FIG. 20, and A to H of FIG. 21.

TABLE 5

Example 2 Basic Lens Data

| Si | Ri | Di | Ndj | ν dj |
|---|---|---|---|---|
| *1 | 374.6965 | 6.8961 | 1.49100 | 57.56 |
| *2 | 57.3032 | 15.8252 | | |
| 3 | 271.8534 | 2.3325 | 1.79952 | 42.22 |
| 4 | 23.3211 | 13.3559 | | |
| 5 | −57.7555 | 1.6834 | 1.48749 | 70.23 |
| 6 | 50.2088 | DD[6] | | |
| 7 | 155.6179 | 5.3635 | 1.83400 | 37.16 |
| 8 | −80.8110 | DD[8] | | |
| *9 | 79.8254 | 3.8537 | 1.49100 | 57.56 |
| *10 | 41.5082 | DD[10] | | |
| 11 | 52.2743 | 6.0745 | 1.71300 | 53.87 |
| 12 | −151.4328 | 0.7136 | | |
| 13 | 52.5770 | 3.5403 | 1.76182 | 26.52 |
| 14 | 139.8193 | DD[14] | | |
| 15 | −84.2803 | 1.4299 | 1.71300 | 53.87 |
| 16 | 24.7437 | 3.7486 | 1.48749 | 70.23 |
| 17 | −79.9426 | DD[17] | | |
| 18 | 49.7453 | 1.1561 | 1.72825 | 28.46 |
| 19 | 24.4319 | 0.7401 | | |
| 20 | 42.7258 | 6.0939 | 1.48749 | 70.23 |
| 21 | −14.8103 | 1.4806 | 1.83400 | 37.16 |
| 22 | −65.8908 | 1.6083 | | |
| 23 | −46.5271 | 1.5313 | 1.83400 | 37.16 |
| 24 | 95.0033 | 5.0693 | 1.49700 | 81.54 |
| 25 | −28.7469 | 0.2028 | | |
| 26 | 110.3070 | 7.3966 | 1.49700 | 81.54 |
| 27 | −27.0432 | DD[27] | | |
| 28 | 52.3890 | 4.3139 | 1.78590 | 44.20 |
| 29 | −357.7293 | 13.1155 | | |
| 30 | ∞ | 25.8602 | 1.51633 | 64.14 |
| 31 | ∞ | | | |

TABLE 6

Example 2 Aspherical Surface Coefficient

| Si | 1 | 2 | 9 | 10 |
|---|---|---|---|---|
| KA | 1.0000000E+00 | 1.0000000E+00 | 8.9023218E−01 | 1.0100648E+00 |
| A4 | 7.3014053E−06 | 3.5956698E−06 | −2.5784823E−05 | −2.7456855E−05 |
| A6 | −5.8023678E−09 | −3.9014465E−09 | 3.0034013E−08 | 2.9923015E−08 |
| A8 | 4.4850996E−12 | −2.9119367E−12 | −2.6876778E−11 | −1.2625903E−11 |
| A10 | −2.4073830E−15 | 4.8716622E−15 | 5.4863752E−14 | 7.8697155E−15 |
| A12 | 8.0989916E−19 | −2.3572798E−18 | −6.7977724E−17 | −2.8033384E−17 |
| A14 | −1.1439015E−22 | 4.0278680E−22 | | |

TABLE 7

Example 2 Specs and Variable Surface Distance

| Magnification Status Projection Distance | Wide Angle End ∞ | Telephoto End ∞ | Wide Angle End 1300 | Telephoto End 1300 | Wide Angle End 480 | Telephoto End 480 |
|---|---|---|---|---|---|---|
| Zoom Ratio | 1.0 | 1.3 | 1.0 | 1.3 | 1.0 | 1.3 |
| f | 10.00 | 12.87 | 9.91 | 12.76 | 9.79 | 12.60 |
| FNo. | 1.73 | 1.91 | 1.73 | 1.91 | 1.73 | 1.91 |
| 2ω(°) | 96.0 | 81.8 | 96.6 | 82.4 | 97.2 | 83.0 |
| DD[6] | 8.3717 | 8.3717 | 7.4617 | 7.4617 | 6.0844 | 6.0844 |
| DD[8] | 6.8213 | 6.8213 | 4.6938 | 4.6938 | 1.3844 | 1.3844 |
| DD[10] | 15.4062 | 4.9622 | 18.5837 | 8.1397 | 23.4931 | 13.0491 |
| DD[14] | 10.8283 | 17.3326 | 10.8283 | 17.3326 | 10.8283 | 17.3326 |
| DD[17] | 8.3810 | 1.5298 | 8.3810 | 1.5298 | 8.3810 | 1.5298 |
| DD[27] | 0.5071 | 11.2980 | 0.5071 | 11.2980 | 0.5071 | 11.2980 |

Conjugate Length of Combined Optical System: −7.244

Example 3

FIGS. 8 and 9 illustrate cross-sectional views of the projection lens of Example 3 with ray trajectories. FIG. 8 illustrates the dispositions and configurations of each lens group at the wide angle end with projection distances being infinity and 480 on the upper and lower sides respectively. FIG. 9 illustrates the dispositions and configurations of each lens group at the wide angle end and the telephoto end with the projection distance being infinity on the upper and lower sides respectively.

The schematic configuration of the projection lens of Example 3 is as follows. The projection lens of Example 3 is composed of 17 lenses of lenses L1 to L17 disposed in order from the magnification side and is a zoom lens in which five lens groups of a first lens group G1 to a fifth lens group G5 are disposed in order from the magnification side. The first lens group G1 has a negative refractive power. The second lens group G2 is composed of two lens groups of second A lens group G2A constituted by one lens L4 and second B lens group G2B constituted by one lens L5 disposed in order from the magnification side, and the second lens group G2 corresponds to the correction group Gc. When changing magnification, two lens groups of the third lens group G3 and the fourth lens group G4 are moved in an optical axis direction while changing the distance between them. When focusing, the first lens group G1 is moved in an optical axis direction. The lens L4 is a negative meniscus lens with a convex surface on the magnification side and the lens L5 is a positive meniscus lens with a convex surface on the magnification side.

Tables 8, 9, and 10 respectively show basic lens data, aspherical surface coefficients, and specs with respect to the d-line and values of variable surface distances of the projection lens of Example 3. The projection lens of Example 3 is configured non-telecentric on the reduction side and the pupil position is shown at the bottom outside the box of Table 10. The sign of the pupil position is negative if the pupil position is on the magnification side of the reduction side conjugate point. Aberration diagrams of the projection lens of Example 3 are illustrated in A to H of FIG. 22, A to H of FIG. 23, and A to H of FIG. 24.

TABLE 8

Example 3 Basic Lens Data

| Si | Ri | Di | Ndj | νdj |
|---|---|---|---|---|
| *1 | −62.8798 | 6.1636 | 1.49100 | 57.58 |
| *2 | −369.3784 | 6.3622 | | |
| 3 | 56.1843 | 2.6416 | 1.74400 | 44.78 |
| 4 | 26.3773 | 16.4108 | | |
| 5 | −83.6817 | 3.4314 | 1.77250 | 49.60 |
| 6 | 45.7672 | DD[6] | | |
| 7 | 118.6827 | 2.6407 | 1.72342 | 37.95 |
| 8 | 46.6133 | DD[8] | | |

TABLE 8-continued

Example 3 Basic Lens Data

| Si | Ri | Di | Ndj | νdj |
|---|---|---|---|---|
| 9 | 56.2232 | 5.2731 | 1.51633 | 64.14 |
| 10 | 333.0514 | DD[10] | | |
| 11 | 254.9300 | 6.8711 | 1.59551 | 39.24 |
| 12 | −69.7582 | 6.3767 | | |
| 13 | 77.2523 | 5.6700 | 1.54814 | 45.79 |
| 14 | −383.2793 | 2.4626 | | |
| 15 | −72.9112 | 3.1748 | 1.62041 | 60.29 |
| 16 | 30.2139 | 9.3859 | 1.56732 | 42.82 |
| 17 | −214.3885 | DD[17] | | |
| 18 | 63.8230 | 2.6512 | 1.80518 | 25.42 |
| 19 | 35.0382 | 6.2926 | 1.48749 | 70.23 |
| 20 | −65.0151 | DD[20] | | |
| 21 | 46.3640 | 4.0518 | 1.48749 | 70.23 |
| 22 | 369.3310 | 1.5566 | | |
| 23 | −44.5679 | 2.4674 | 1.77250 | 49.60 |
| 24 | 21.1624 | 0.4748 | | |
| 25 | 25.2406 | 6.2141 | 1.51633 | 64.14 |
| 26 | 189.6294 | 0.1764 | | |
| 27 | 24.1989 | 6.7611 | 1.48749 | 70.23 |
| 28 | −34.2888 | 0.2634 | | |
| 29 | 55.7057 | 2.2005 | 1.80400 | 46.57 |
| 30 | 15.6108 | 0.1396 | | |
| 31 | 16.0662 | 6.2366 | 1.51633 | 64.14 |
| 32 | −88.1299 | 37.6974 | | |
| 33 | ∞ | 2.6415 | 1.50847 | 61.19 |
| 34 | ∞ | | | |

TABLE 9

Example 3 Aspherical Surface Coefficient

| Si | 1 | 2 |
|---|---|---|
| KA | 8.0000000E−01 | −2.7978309E+00 |
| A3 | 2.5028312E−04 | 2.9862871E−04 |
| A4 | 2.3734795E−05 | 1.2863359E−05 |

TABLE 9-continued

Example 3 Aspherical Surface Coefficient

| Si | 1 | 2 |
|---|---|---|
| A5 | −9.8100684E−07 | −2.4392742E−07 |
| A6 | 8.1638860E−09 | −7.7620900E−09 |
| A7 | 1.9227693E−10 | −2.8369913E−10 |
| A8 | −1.5347738E−12 | 8.2934103E−12 |
| A9 | −6.0390533E−14 | 2.3006783E−13 |
| A10 | 2.5046114E−16 | 1.2032225E−15 |
| A11 | 1.2881155E−17 | −1.6351602E−16 |
| A12 | 1.1637218E−19 | −1.9427753E−18 |
| A13 | −3.5763838E−21 | 5.9519583E−20 |

TABLE 10

Example 3 Specs and Variable Surface Distance

| Magnification Status Projection Distance | Wide Angle End ∞ | Telephoto End ∞ | Wide Angle End 1300 | Telephoto End 1300 | Wide Angle End 480 | Telephoto End 480 |
|---|---|---|---|---|---|---|
| Zoom Ratio | 1.0 | 1.2 | 1.0 | 1.2 | 1.0 | 1.2 |
| f | 10.00 | 12.50 | 10.02 | 12.52 | 10.06 | 12.56 |
| FNo. | 2.40 | 2.40 | 2.40 | 2.40 | 2.40 | 2.40 |
| 2ω(°) | 99.8 | 86.2 | 99.6 | 85.8 | 99.2 | 85.2 |
| DD[6] | 18.8723 | 18.8723 | 14.2769 | 14.2769 | 7.4034 | 7.4034 |
| DD[8] | 6.5614 | 6.5614 | 6.3716 | 6.3716 | 6.1339 | 6.1339 |
| DD[10] | 18.0217 | 8.4281 | 23.0115 | 13.4179 | 30.4492 | 20.8556 |
| DD[17] | 34.9522 | 26.2449 | 34.9522 | 26.2449 | 34.9522 | 26.2449 |
| DD[20] | 0.7476 | 19.0485 | 0.7476 | 19.0485 | 0.7476 | 19.0485 |

Conjugate Length of Combined Optical System: 1.885
Reduction Side Pupil Position: −54.0195 from Reduction Side Conjugate Point in terms of Air Equivalent Distance

Example 4

FIGS. 10 and 11 illustrate cross-sectional views of the projection lens of Example 4 with ray trajectories. FIG. 10 illustrates the dispositions and configurations of each lens group at the wide angle end with projection distances being infinity and 480 on the upper and lower sides respectively. FIG. 11 illustrates the dispositions and configurations of each lens group at the wide angle end and the telephoto end with the projection distance being infinity on the upper and lower sides respectively. The schematic configuration of the projection lens of Example 4 is substantially identical to that of Example 1. Tables 11, 12, and 13 respectively show basic lens data, aspherical surface coefficients, and specs with respect to the d-line and values of variable surface distances of the projection lens of Example 4. Aberration diagrams of the projection lens of Example 4 are illustrated in A to H of FIG. 25, A to H of FIG. 26, and A to H of FIG. 27.

TABLE 11

Example 4 Basic Lens Data

| Si | Ri | Di | Ndj | νdj |
|---|---|---|---|---|
| *1 | −39.5959 | 5.2952 | 1.49100 | 57.58 |
| *2 | −66.3992 | 9.8642 | | |
| 3 | 106.1713 | 2.0424 | 1.63854 | 55.38 |
| 4 | 20.3398 | 11.9747 | | |
| 5 | −35.9336 | 1.5886 | 1.80100 | 34.97 |
| 6 | 52.1752 | DD[6] | | |
| 7 | −185.9193 | 2.9653 | 1.63854 | 55.38 |
| 8 | −66.1914 | DD[8] | | |
| 9 | −37.7348 | 3.4948 | 1.51633 | 64.14 |
| 10 | −30.2399 | DD[10] | | |
| 11 | 202.4502 | 4.8338 | 1.77250 | 49.60 |
| 12 | −106.1740 | 1.7474 | | |
| 13 | 36.9946 | 6.0517 | 1.74400 | 44.78 |
| 14 | 197.7695 | DD[14] | | |

TABLE 11-continued

Example 4 Basic Lens Data

| Si | Ri | Di | Ndj | ν dj |
|---|---|---|---|---|
| 15 | −246.7645 | 0.9910 | 1.77250 | 49.60 |
| 16 | 20.0666 | 3.0258 | 1.51633 | 64.14 |
| 17 | ∞ | DD[17] | | |
| *18 | 85.6462 | 0.3026 | 1.52516 | 53.74 |
| 19 | 85.6462 | 1.7399 | 1.58144 | 40.75 |
| 20 | 36.8979 | 1.0515 | | |
| 21 | 57.7944 | 6.4829 | 1.48749 | 70.23 |
| 22 | −11.3438 | 1.1347 | 1.83400 | 37.16 |
| 23 | −80.3335 | 1.0969 | | |
| 24 | 262.1529 | 1.2936 | 1.80400 | 46.58 |
| 25 | 33.6193 | 5.6961 | 1.49700 | 81.54 |
| 26 | −33.6193 | 0.6657 | | |
| 27 | 235.7943 | 4.8338 | 1.49700 | 81.54 |
| 28 | −29.9424 | DD[28] | | |
| 29 | 50.9620 | 4.8262 | 1.63854 | 55.38 |
| 30 | −76.4314 | 10.2848 | | |
| 31 | ∞ | 24.4336 | 1.51633 | 64.14 |
| 32 | ∞ | | | |

TABLE 12

Example 4 Aspherical Surface Coefficient

| Si | 1 | 2 | 18 |
|---|---|---|---|
| KA | 5.0260498E−03 | −1.0158003E+01 | 1.0000000E+00 |
| A3 | 1.6223167E−04 | 2.1340792E−04 | — |
| A4 | 5.0427551E−05 | 3.1117648E−05 | 1.9154620E−05 |
| A5 | −2.0244753E−06 | −1.0654979E−06 | — |
| A6 | 1.1839469E−08 | 1.9290265E−09 | 6.5379339E−08 |
| A7 | 9.5645446E−10 | 1.5689719E−10 | — |
| A8 | −1.4248257E−11 | −2.4539367E−12 | 9.2570058E−10 |
| A9 | −2.3271572E−13 | 1.5016888E−13 | — |
| A10 | 2.9286313E−15 | 9.2411215E−17 | 2.0138938E−12 |
| A11 | 9.6045213E−17 | −9.3750631E−17 | |
| A12 | −1.1021685E−18 | 7.1920937E−19 | |
| A13 | 6.7907082E−23 | −2.7553411E−22 | |
| A14 | −8.7632331E−24 | −2.9342221E−24 | |
| A15 | −1.2647281E−25 | 1.4346455E−24 | |

TABLE 13

Example 4 Specs and Variable Surface Distance

| Magnification Status Projection Distance | Wide Angle End ∞ | Telephoto End ∞ | Wide Angle End 1300 | Telephoto End 1300 | Wide Angle End 480 | Telephoto End 480 |
|---|---|---|---|---|---|---|
| Zoom Ratio | 1.0 | 1.3 | 1.0 | 1.3 | 1.0 | 1.3 |
| f | 10.00 | 13.00 | 9.98 | 12.98 | 9.94 | 12.94 |
| FNo. | 1.90 | 2.10 | 1.90 | 2.10 | 1.90 | 2.10 |
| 2ω(°) | 89.6 | 75.2 | 89.6 | 75.2 | 89.8 | 75.4 |
| DD[6] | 9.9399 | 9.9399 | 9.3207 | 9.3207 | 8.2502 | 8.2502 |
| DD[8] | 5.8172 | 5.8172 | 7.5221 | 7.5221 | 10.3468 | 10.3468 |
| DD[10] | 14.0399 | 3.9434 | 13.0500 | 2.9534 | 11.4503 | 1.3537 |
| DD[14] | 18.7526 | 26.5845 | 18.7526 | 26.5845 | 18.7526 | 26.5845 |
| DD[17] | 10.0382 | 1.7247 | 10.0382 | 1.7247 | 10.0382 | 1.7247 |
| DD[28] | 1.5583 | 12.1364 | 1.5583 | 12.1364 | 1.5583 | 12.1364 |

Conjugate Length of Combined Optical System: −17.512

Example 5

FIGS. 12 and 13 illustrate cross-sectional views of the projection lens of Example 5 with ray trajectories. FIG. 12 illustrates the dispositions and configurations of each lens group at the wide angle end with projection distances being infinity and 480 on the upper and lower sides respectively. FIG. 13 illustrates the dispositions and configurations of each lens group at the wide angle end and the telephoto end with the projection distance being infinity on the upper and lower sides respectively. The schematic configuration of the projection lens of Example 5 is similar to that of Example 1 but differs therefrom in that the entire system is composed of 15 lenses of first lens L1 to fifteenth lens L15, the second A lens group G2A is constituted by the lens L5, the second B lens group G2B is constituted by the lens L6, the lens L5 is a negative meniscus lens with a convex surface on the reduction side, and the lens L6 is a positive meniscus lens with a convex surface on the reduction side. Tables 14 and 15 respectively show basic lens data and specs with respect to the d-line and values of variable surface distances of the projection lens of Example 5. Aberration diagrams of the projection lens of Example 5 are illustrated in A to H of FIG. 28, A to H of FIG. 29, and A to H of FIG. 30.

TABLE 14

Example 5 Basic Lens Data

| Si | Ri | Di | Ndj | ν dj |
|---|---|---|---|---|
| 1 | 47.3539 | 4.9936 | 1.77250 | 49.60 |
| 2 | 134.3574 | 0.1036 | | |
| 3 | 28.4845 | 1.2948 | 1.77250 | 49.60 |
| 4 | 15.4803 | 5.1328 | | |
| 5 | 46.4711 | 1.0876 | 1.77250 | 49.60 |
| 6 | 18.4127 | 5.3798 | | |
| 7 | −39.2386 | 0.8801 | 1.84666 | 23.78 |
| 8 | 41.5320 | DD[8] | | |
| 9 | −27.1317 | 1.0514 | 1.62041 | 60.29 |
| 10 | −48.9235 | DD[10] | | |
| 11 | −29.4896 | 2.7420 | 1.59551 | 39.24 |
| 12 | −21.3001 | DD[12] | | |
| 13 | ∞ | 2.6190 | 1.83400 | 37.16 |
| 14 | −53.2809 | 0.1037 | | |
| 15 | 40.4993 | 2.6337 | 1.77250 | 49.60 |
| 16 | 166.4782 | DD[16] | | |
| 17 | 58.0447 | 1.4926 | 1.48749 | 70.23 |
| 18 | −68.2003 | DD[18] | | |
| 19 | 22.6358 | 1.1414 | 1.53172 | 48.84 |
| 20 | 14.6760 | 1.4685 | | |
| 21 | 171.3657 | 1.8837 | 1.48749 | 70.23 |
| 22 | −27.1920 | 0.9804 | | |
| 23 | −13.4521 | 0.6782 | 1.80610 | 33.27 |

TABLE 14-continued

Example 5 Basic Lens Data

| Si | Ri | Di | Ndj | ν dj |
|---|---|---|---|---|
| 24 | 26.6124 | 3.8319 | 1.49700 | 81.54 |
| 25 | −20.4337 | 1.9283 | | |
| 26 | 76.1922 | 5.6175 | 1.48749 | 70.23 |

TABLE 14-continued

Example 5 Basic Lens Data

| Si | Ri | Di | Ndj | ν dj |
|---|---|---|---|---|
| 27 | −17.9649 | DD[27] | | |
| 28 | 44.2720 | 3.3653 | 1.51680 | 64.20 |
| 29 | −60.0206 | 9.8498 | | |
| 30 | ∞ | 15.5519 | 1.51680 | 64.20 |
| 31 | ∞ | | | |

TABLE 15

Example 5 Specs and Variable Surface Distance

| Magnification Status Projection Distance | Wide Angle End ∞ | Telephoto End ∞ | Wide Angle End 1300 | Telephoto End 1300 | Wide Angle End 480 | Telephoto End 480 |
|---|---|---|---|---|---|---|
| Zoom Ratio | 1.0 | 1.3 | 1.0 | 1.3 | 1.0 | 1.3 |
| f | 10.00 | 12.90 | 9.97 | 12.87 | 9.92 | 12.82 |
| FNo. | 2.05 | 2.63 | 2.05 | 2.63 | 2.05 | 2.63 |
| 2ω(°) | 77.8 | 63.6 | 78.0 | 63.8 | 78.0 | 63.8 |
| DD[8] | 6.8776 | 6.8776 | 7.8916 | 7.8916 | 9.3757 | 9.3757 |
| DD[10] | 2.0910 | 2.0910 | 1.8882 | 1.8882 | 1.6176 | 1.6176 |
| DD[12] | 8.1448 | 2.3165 | 7.4429 | 1.6145 | 6.4067 | 0.5784 |
| DD[16] | 29.2449 | 19.5347 | 29.2449 | 19.5347 | 29.2449 | 19.5347 |
| DD[18] | 5.7333 | 17.2528 | 5.7333 | 17.2528 | 5.7333 | 17.2528 |
| DD[27] | 1.0563 | 5.0754 | 1.0563 | 5.0754 | 1.0563 | 5.0754 |

Conjugate Length of Combined Optical System: −2.575

Example 6

FIGS. 14 and 15 illustrate cross-sectional views of the projection lens of Example 6 with ray trajectories. FIG. 14 illustrates the dispositions and configurations of each lens group at the wide angle end with projection distances being infinity and 480 on the upper and lower sides respectively. FIG. 15 illustrates the dispositions and configurations of each lens group at the wide angle end and the telephoto end with the projection distance being infinity on the upper and lower sides respectively.

The projection lens of Example 6 is a modification of Example 1 and substantially identical to that of Example 1 other than the focusing method. In the projection lens of Example 6, the first lens group G1 and the second lens group G2 are integrally moved in an optical axis direction when focusing. That is, in the projection lens of Example 6, the second lens group G2, acting as the correction group Gc, forms a part of lens group which is moved when focusing. Tables 16, 17, and 18 respectively show basic lens data, aspherical surface coefficients, and specs with respect to the d-line and values of variable surface distances of the projection lens of Example 6. Aberration diagrams of the projection lens of Example 6 are illustrated in A to H of FIG. 31, A to H of FIG. 32, and A to H of FIG. 33.

TABLE 16

Example 6 Basic Lens Data

| Si | Ri | Di | Ndj | ν dj |
|---|---|---|---|---|
| *1 | −39.6177 | 5.2981 | 1.49100 | 57.58 |
| *2 | −66.4357 | 9.8015 | | |
| 3 | 109.1591 | 2.0436 | 1.63854 | 55.38 |
| 4 | 20.4168 | 12.0570 | | |
| 5 | −35.9534 | 1.5894 | 1.80100 | 34.97 |
| 6 | 53.8519 | DD[6] | | |
| 7 | −168.4445 | 2.9594 | 1.63854 | 55.38 |
| 8 | −64.5642 | DD[8] | | |

TABLE 16-continued

Example 6 Basic Lens Data

| Si | Ri | Di | Ndj | ν dj |
|---|---|---|---|---|
| 9 | −38.0856 | 3.4816 | 1.51633 | 64.14 |
| 10 | −30.4579 | DD[10] | | |
| 11 | 217.0744 | 5.0029 | 1.77250 | 49.60 |
| 12 | −101.0760 | 0.2271 | | |
| 13 | 37.2800 | 6.0020 | 1.74400 | 44.78 |
| 14 | 197.1748 | DD[14] | | |

TABLE 16-continued

Example 6 Basic Lens Data

| Si | Ri | Di | Ndj | ν dj |
|---|---|---|---|---|
| 15 | −227.7873 | 0.9915 | 1.77250 | 49.60 |
| 16 | 20.5151 | 3.0124 | 1.51633 | 64.14 |
| 17 | ∞ | DD[17] | | |
| *18 | 85.6933 | 0.3027 | 1.52516 | 53.74 |
| 19 | 85.6933 | 1.7408 | 1.58144 | 40.75 |
| 20 | 36.9182 | 1.1126 | | |
| 21 | 63.4716 | 6.3729 | 1.49700 | 81.54 |
| 22 | −11.3501 | 1.1353 | 1.83400 | 37.16 |
| 23 | −76.4976 | 1.1504 | | |
| 24 | 178.1314 | 1.2943 | 1.80400 | 46.58 |
| 25 | 33.3486 | 6.3199 | 1.48749 | 70.23 |
| 26 | −33.3486 | 0.5449 | | |
| 27 | 352.6566 | 4.6548 | 1.49700 | 81.54 |
| 28 | −31.6839 | DD[28] | | |
| 29 | 49.5782 | 4.8743 | 1.63854 | 55.38 |
| 30 | −77.3962 | 10.0450 | | |
| 31 | ∞ | 24.4470 | 1.51633 | 64.14 |
| 32 | ∞ | | | |

TABLE 17

Example 6 Aspherical Surface Coefficient

| Si | 1 | 2 | 18 |
|---|---|---|---|
| KA | 5.0260498E−03 | −1.0158003E+01 | 1.0000000E+00 |
| A3 | 1.6205349E−04 | 2.1317353E−04 | — |
| A4 | 5.0344494E−05 | 3.1066395E−05 | 1.9123071E−05 |
| A5 | −2.0200306E−06 | −1.0631587E−06 | — |
| A6 | 1.1806986E−08 | 1.9237340E−09 | 6.5199965E−08 |
| A7 | 9.5330638E−10 | 1.5638078E−10 | — |
| A8 | −1.4193559E−11 | −2.4445163E−12 | 9.2214689E−10 |
| A9 | −2.3169500E−13 | 1.4951022E−13 | — |
| A10 | 2.9141843E−15 | 9.1955347E−17 | 2.0039591E−12 |
| A11 | 9.5518919E−17 | −9.3236911E−17 | |
| A12 | −1.0955269E−18 | 7.1487544E−19 | |

TABLE 17-continued

Example 6 Aspherical Surface Coefficient

| Si | 1 | 2 | 18 |
|---|---|---|---|
| A13 | 6.7460798E−23 | −2.7372331E−22 | |
| A14 | −8.7008592E−24 | −2.9133372E−24 | |
| A15 | −1.2550364E−25 | 1.4236516E−24 | |

TABLE 18

Example 6 Specs and Variable Surface Distance

| Magnification Status | Wide Angle End | Telephoto End | Wide Angle End | Telephoto End | Wide Angle End | Telephoto End |
|---|---|---|---|---|---|---|
| Projection Distance | ∞ | ∞ | 1300 | 1300 | 480 | 480 |
| Zoom Ratio | 1.0 | 1.3 | 1.0 | 1.3 | 1.0 | 1.3 |
| f | 10.00 | 13.00 | 9.96 | 12.95 | 9.90 | 12.88 |
| FNo. | 1.90 | 2.10 | 1.90 | 2.10 | 1.90 | 2.10 |
| 2ω(°) | 89.6 | 75.2 | 89.8 | 75.4 | 90.0 | 75.6 |
| DD[6] | 9.0553 | 9.0553 | 8.1053 | 8.1053 | 6.8553 | 6.8553 |
| DD[8] | 7.0537 | 7.0537 | 9.2478 | 9.2478 | 12.0299 | 12.0299 |
| DD[10] | 14.3038 | 4.3023 | 13.2858 | 3.2843 | 12.1118 | 2.1103 |
| DD[14] | 19.0319 | 26.9289 | 19.0319 | 26.9289 | 19.0319 | 26.9289 |
| DD[17] | 10.2087 | 1.8907 | 10.2087 | 1.8907 | 10.2087 | 1.8907 |
| DD[28] | 1.5131 | 11.9356 | 1.5131 | 11.9356 | 1.5131 | 11.9356 |

Conjugate Length of Combined Optical System (Projection Distance = ∞): −17.016
Conjugate Length of Combined Optical System (Projection Distance = 1300): −16.886
Conjugate Length of Combined Optical System (Projection Distance = 480): −16.684

As Example 6 employs the aforementioned focusing method, the conjugate length of the combined optical system is not constant but substantially constant before and after the correction of field curvature by the correction group Gc and focusing operation for a small amount is performed after the correction of field curvature. Table 19 shows, by way of example, the amounts of movement of the focusing group (the first lens group G1 and the second lens group G2) of Example 6. The sign of the amount of movement is positive if the movement is from the magnification side toward the reduction side and negative if the movement is in the reverse direction.

As Table 19 shows, in the projection lens of Example 6, when the projection distance is changed from infinity to 1300, if the focusing mechanism is driven, the focusing group is moved by 0.2276. Thereafter, if field curvature is corrected by the correction group Gc, slight defocusing occurs by the correction since the conjugate length of the combined optical system is substantially constant, and the focusing group is moved by −0.001 in order to adjust the defocusing. Likewise, when the projection distance of the projection lens of Example 6 is changed from infinity to 480, the focusing group is moved by 0.5933 and, thereafter, if field curvature is corrected by the correction group Gc, slight defocusing occurs and the focusing group is moved by −0.008 in order to adjust the defocusing.

As Table 19 shows, the amount of movement of the focusing group for adjusting the defocusing due to the movement of the correction group Gc for correcting field curvature when the projection distance is changed is very small in comparison with the amount of movement of the focusing group for performing focusing without correcting field curvature when the projection distance is changed by the same amount. That is, when correcting variation in the field curvature arising from the change in the magnification side conjugate position (change in the projection distance) by moving the correction group Gc, the amount of change in the reduction side conjugate point arising from change in the conjugate length of the combined optical system is smaller than the amount of change in the reduction side conjugate point arising from change in the magnification side conjugate position, less than $1/10$.

TABLE 19

| | |
|---|---|
| Focus Group Movement Amount (Projection Distance = ∞→1300) | 0.2276 |
| Focus Group Movement Amount after Field Curvature Correction (Projection Distance = 300) | −0.001 |
| Focus Group Movement Amount (Projection Distance = ∞→480) | 0.5933 |
| Focus Group Movement Amount after Field Curvature Correction (Projection Distance = 480) | −0.008 |

Table 20 shows values corresponding to the conditional expressions (1) to (3) and values related to the conditional expressions with respect to Examples 1 to 6. The values shown in Table 20 are those with respect to the d-line. The magnification ratios β of the combined optical systems in the projection lenses when the projection distance is 480 are shown in the bottom of Table 20. From these values and the values of the magnification ratios β of the combined optical systems in the projection lenses when the projection distance is infinity shown at the top, it is known that changes in β of Examples 1 to 6 are all within ±3%. This allows, in Examples 1 to 6, the change in the projection size to be minimized even if the field curvature correction function is used to make fine adjustment of field curvature variation arising from manufacturing error or the like at the time of changing magnification.

TABLE 20

|   |   | Example 1 | Example 2 | Example 3 | Example 4 | Example 5 | Example 6 |
|---|---|---|---|---|---|---|---|
| (1) | β (Projection Distance = ∞) | 1.532 | 1.444 | 0.980 | 1.547 | 1.075 | 1.532 |
| (2) | fG1/f | −1.135 | −1.367 | −1.652 | −1.128 | −1.204 | −1.135 |
| (3) | y/f | 0.995 | 1.116 | 1.189 | 0.995 | 0.798 | 0.995 |
|   | f | 10.000 | 10.000 | 10.000 | 10.000 | 10.000 | 10.000 |
|   | fG1 | −11.354 | −13.673 | −16.521 | −11.279 | −12.036 | −11.354 |
|   | y | 9.953 | 11.155 | 11.887 | 9.947 | 7.976 | 9.953 |
|   | β (Projection Distance = 480) | 1.521 | 1.414 | 0.990 | 1.536 | 1.068 | 1.516 |

Figure 34:
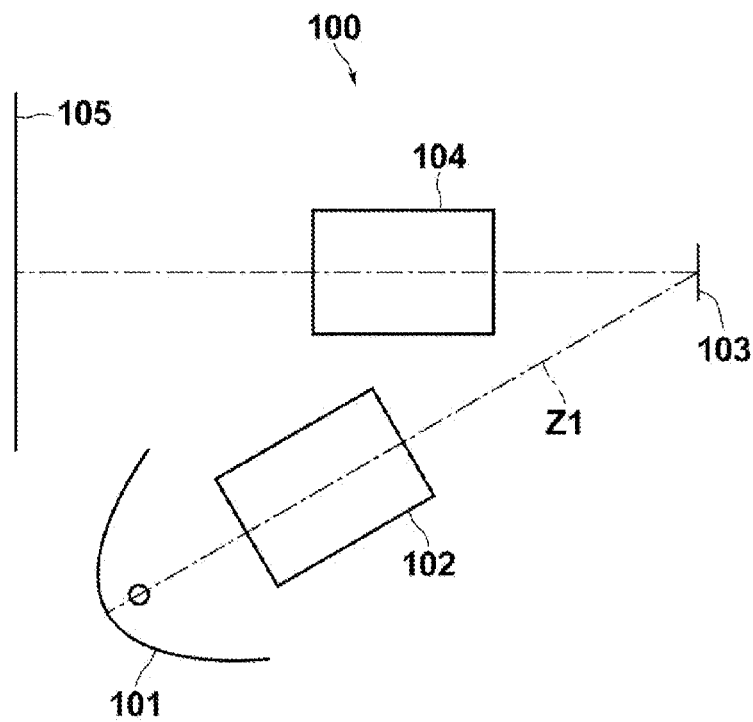
FIG. 34 is a schematic configuration diagram of a projection display apparatus according to an embodiment of the present invention.

Next, a projection display apparatus according to an embodiment of the present invention will be described. FIG. 34 is a schematic configuration diagram of a projection display apparatus according to an embodiment of the present invention. The projection display apparatus 100 illustrated in FIG. 34 includes a light source 101, an illumination optical system 102, a DMD 103 as the light valve, and the projection lens 104 according to an embodiment of the present invention. Note that each component is schematically illustrated in FIG. 34. A light beam outputted from the light source 101 is selected and converted to each light of three primary colors (R, G, B) in a time series manner by a color wheel (not shown), then the intensity distribution of the light is uniformed across a cross-section perpendicular to the optical axis Z1 of the light beam by the illumination optical system 102, and inputted to the DMD 103. Based on the change in color of the inputted light, the modulation switching is performed for the colored light in the DMD 103. The light optically modulated by the DMD 103 is inputted to the projection lens 104. The optical image formed by the optically modulated light is projected onto the screen 105 by the projection lens 104.

Figure 35:
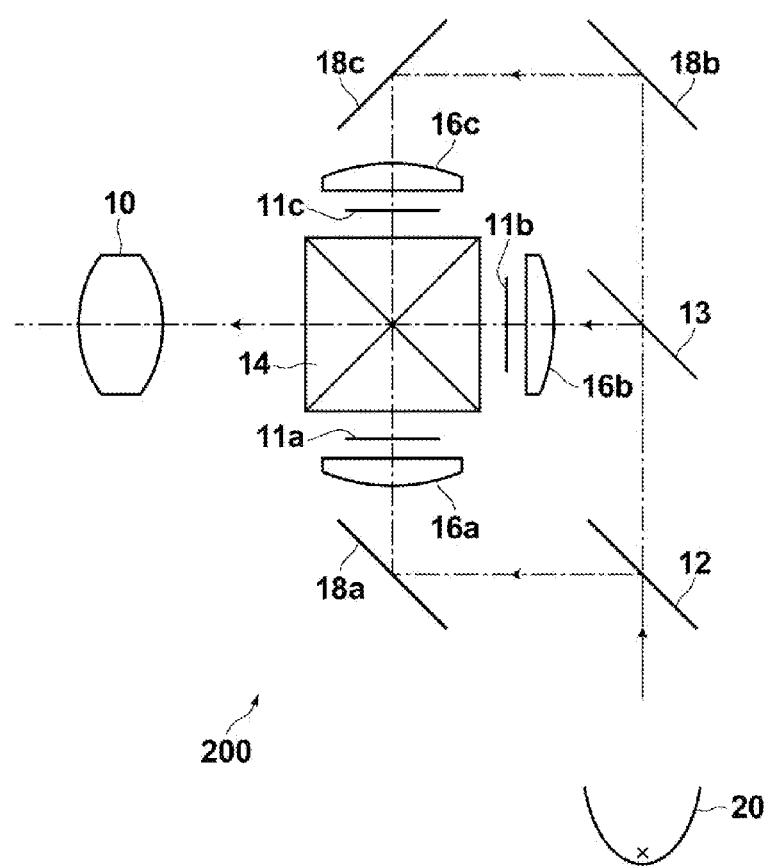
FIG. 35 is a schematic configuration diagram of a projection display apparatus according to another embodiment of the present invention.

FIG. 35 is a schematic configuration diagram of a projection display apparatus according to another embodiment of the present invention. The projection display apparatus 200 illustrated in FIG. 35 includes a projection lens 10 according to an embodiment of the present invention, a light source 20, transmissive display elements 11a to 11c as the light valves corresponding to each color light, dichroic mirrors 12, 13 for color separation, a cross-dichroic prism 14 for color combining, condenser lenses 16a to 16c, and total reflection mirrors 18a to 18c for optical path deflection. Note that the projection lens 10 is schematically illustrated in FIG. 35. Although an integrator is disposed between the light source 20 and the dichroic mirror 12, it is omitted in FIG. 35.

A white light emitted from the light source 20 is separated into three color light beams (G light, B light, R light) by the dichroic mirrors 12, 13 and inputted to corresponding transmissive display elements 11a to 11c for optical modification via the condenser lenses 16a to 16c. The optically modulated light beams are color-combined by the cross dichroic prism 14 and the color-combined light beam is inputted to the projection lens 10. The projection lens 10 projects an optical image formed by the light optically modulated by the transmissive display elements 11a to 11c onto a screen (not shown).

So far the present invention has been described by way of embodiments and Examples, but it should be understood that the projection lens of the present invention is not limited to the embodiments and Examples described above, and various changes and modifications may be made. For example, the radius of curvature, surface distance, refractive index, Abbe number, and aspherical surface coefficients of each lens may be changed as appropriate.

Further, the projection display apparatus of the present invention is not limited to those having aforementioned configurations and, for example, the light valve and optical members used for separating or combining light beams are not limited to those having the structures described above, and various changes and modifications may be made to the embodiments.

What is claimed is:

1. A projection lens having a positive refractive power as a whole and comprising a correction group consisting of a plurality of lens groups that corrects field curvature by moving in an optical axis direction and changing the distance between each lens group, wherein:

the conjugation length of a combined optical system combining the most magnification side lens group constituting the correction group to the most reduction side lens group constituting the correction group in the projection lens is constant before and after the movement of the correction group for correcting field curvature; and when the projection lens is variable in magnification or focusable by moving at least some of the lens groups, the movement of the correction group for correcting field curvature is allowed to be performed independently of the movement for either changing magnification or focusing, wherein a first lens group which has a negative refractive power and is different from the correction group is disposed on the most magnification side, and the lens groups constituting the correction group are adjacently disposed on the reduction side of the first lens group.

2. The projection lens as claimed in claim 1, wherein the projection lens satisfies a conditional expression given below:

$$0.50<\beta<3.00 \tag{1}$$

where β is the magnification ratio of the combined optical system in the projection lens and, when the projection lens is focusable, β is the magnification ratio under the state in which the magnification side conjugate position is at infinity.

3. The projection lens as claimed in claim 2, wherein the projection lens satisfies a conditional expression given below:

$$0.50<\beta<2.50 \tag{1'}$$

4. The projection lens as claimed in claim 3, wherein the projection lens satisfies a conditional expression given below:

$$0.70<\beta<2.00 \tag{1''}$$

5. The projection lens as claimed in claim 1, wherein the lens groups constituting the correction group are all disposed in succession.

6. The projection lens as claimed in claim 1, wherein the projection lens satisfies a conditional expression (2) given below:

$$-3.00<fG1/f<-0.50 \tag{2}$$

where fG1 is the focal length of the first lens group and f is the focal length of the entire system, in which f is the focal length of the entire system at the wide angle end, when the projection lens is variable in magnification, while when the projection lens is focusable, f is the focal length of the entire system under the state in which the magnification side conjugate position is at infinity.

7. The projection lens as claimed in claim 6, wherein the projection lens satisfies a conditional expression given below:

$$-2.00 < fG1/f < -0.90 \qquad (2').$$

8. The projection lens as claimed in claim 1, wherein focusing is performed by moving the first lens group in an optical axis direction.

9. The projection lens as claimed in claim 1, wherein, when the projection lens is variable in magnification or focusable by moving at least some of the lens groups, the correction group is fixed during either changing magnification or focusing.

10. The projection lens as claimed in claim 1, wherein, when the projection lens is variable in magnification or focusable by moving at least some of the lens groups, the most reduction side lens group is fixed during either changing magnification or focusing.

11. The projection lens as claimed in claim 1, wherein the projection lens satisfies a conditional expression given below:

$$0.70 < y/f \qquad (3)$$

where y is the maximum image height when the reduction side is taken as the image side and f is the focal length of the entire system, in which f is the focal length of the entire system at the wide angle end, when the projection lens is variable in magnification, while when the projection lens is focusable, f is the focal length of the entire system under the state in which the magnification side conjugate position is at infinity.

12. The projection lens as claimed in claim 11, wherein the projection lens satisfies a conditional expression given below:

$$0.75 < y/f \qquad (3').$$

13. The projection lens as claimed in claim 1, wherein the projection lens is a zoom lens.

14. A projection display apparatus, comprising a light source, a light valve that receives light from the light source, and the projection lens as claimed in claim 1, as a projection lens that projects an optical image formed by light optically modulated by the light valve onto a screen.

* * * * *